US012425782B2

(12) United States Patent
Lovchinsky et al.

(10) Patent No.: US 12,425,782 B2
(45) **Date of Patent: *Sep. 23, 2025**

(54) EAR-WORN DEVICE WITH NEURAL NETWORK FOR NOISE REDUCTION AND/OR SPATIAL FOCUSING USING MULTIPLE INPUT AUDIO SIGNALS

(71) Applicant: Fortell Research Inc., New York, NY (US)

(72) Inventors: Igor Lovchinsky, New York, NY (US); Israel Malkin, Manhattan Beach, CA (US); Jonathan Macoskey, Pittsburgh, PA (US); Philip Meyers, IV, San Francisco, CA (US); Andrew Casper, Inver Grove Heights, MN (US); Nicholas Morris, Brooklyn, NY (US); Matthew de Jonge, Brooklyn, NY (US)

(73) Assignee: Fortell Research Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 19/060,336

(22) Filed: Feb. 21, 2025

(65) Prior Publication Data

US 2025/0193611 A1 Jun. 12, 2025

Related U.S. Application Data

(63) Continuation of application No. 18/592,720, filed on Mar. 1, 2024, which is a continuation of application (Continued)

(51) Int. Cl.

*H04R 25/00* (2006.01)
*H04S 7/00* (2006.01)

(52) U.S. Cl.

CPC ......... *H04R 25/507* (2013.01); *H04R 25/405* (2013.01); *H04R 25/407* (2013.01);

(Continued)

(58) Field of Classification Search

CPC ....... G10L 2021/02166; G10L 21/0208; G10L 25/78; G10L 17/18; G10L 25/30;

(Continued)

(56) References Cited

U.S. PATENT DOCUMENTS 10,304,475 B1 5/2019 Wang et al.
11,134,351 B1 * 9/2021 Lunner .............. A61B 5/02125

(Continued)

FOREIGN PATENT DOCUMENTS

WO 2023136835 A1 7/2023

OTHER PUBLICATIONS

Notification of Transmittal of The International Search Report and The Written Opinion of The International Searching Authority, or The Declaration, dated Jan. 15, 2025.

(Continued)

*Primary Examiner* — Norman Yu
(74) *Attorney, Agent, or Firm* — Shih IP Law Group, PLLC

(57) ABSTRACT

An ear-worn device may include two or more microphones configured to generate time-domain audio signals, each of the two or more microphones configured to generate one of the time-domain audio signals; processing circuitry comprising analog processing circuitry, digital processing circuitry, beamforming circuitry, and short-time Fourier transformation (STFT) circuitry, the processing circuitry configured to generate, from the time-domain audio signals, one or more frequency-domain non-beamformed audio signals and one or more frequency-domain beamformed signals; and enhancement circuitry comprising neural network (Continued)

circuitry configured to receive multiple frequency-domain input audio signals originating from the one or more frequency-domain non-beamformed audio signals and the one or more frequency-domain beamformed signals, and implement a single neural network trained to generate, based on the multiple frequency-domain input audio signals, a noise-reduced and spatially-focused output audio signal or an output for generating a noise-reduced and spatially-focused output audio signal.

28 Claims, 30 Drawing Sheets

Related U.S. Application Data

No. 18/477,087, filed on Sep. 28, 2023, now Pat. No. 11,937,047.

(60) Provisional application No. 63/517,755, filed on Aug. 4, 2023.

(52) U.S. Cl.
CPC ........... *H04S 7/303* (2013.01); *H04S 2400/11* (2013.01); *H04S 2400/13* (2013.01); *H04S 2400/15* (2013.01)

(58) Field of Classification Search
CPC ...... H04R 3/005; H04R 1/406; H04R 25/407; H04R 2225/43; H04R 25/505; H04R 25/405; H04R 2460/01; H04R 25/507; H04R 2430/20; H04R 2225/41; H04S 2420/01; H04S 2400/15; H04S 2400/11; H04S 2400/13; H04S 7/303
USPC ... 381/312, 313, 92, 23.1, 71.1, 74, 317, 58, 381/56
See application file for complete search history.

(56) References Cited

U.S. PATENT DOCUMENTS

| | | | | |
|---|---|---|---|---|
| 11,646,009 | B1 | 5/2023 | Chhetri | |
| 11,678,111 | B1 | 6/2023 | Messingher Lang et al. | |
| 11,711,648 | B2 | 7/2023 | Lopatka et al. | |
| 2003/0063759 | A1 | 4/2003 | Brennan et al. | |
| 2008/0212810 | A1 * | 9/2008 | Pedersen | H04R 25/407 381/312 |
| 2010/0027820 | A1 | 2/2010 | Kates | |
| 2010/0123785 | A1 | 5/2010 | Chen | |
| 2012/0250916 | A1 | 10/2012 | Hain et al. | |
| 2013/0070935 | A1 | 3/2013 | Hui et al. | |
| 2014/0219471 | A1 | 8/2014 | Deshpande | |
| 2016/0111113 | A1 | 4/2016 | Cho | |
| 2017/0213565 | A1 | 7/2017 | Makinen | |
| 2017/0295439 | A1 | 10/2017 | Xu | |
| 2018/0063654 | A1 | 3/2018 | Kuriger | |
| 2018/0146285 | A1 * | 5/2018 | Benattar | H04R 3/005 |
| 2019/0208317 | A1 | 7/2019 | Woodruff | |
| 2019/0320260 | A1 * | 10/2019 | Alders | G10L 21/0316 |
| 2019/0335288 | A1 | 10/2019 | Latypov | |
| 2020/0322735 | A1 | 10/2020 | Mosgaard et al. | |
| 2021/0125625 | A1 | 4/2021 | Huang | |
| 2021/0281958 | A1 | 9/2021 | Diehl et al. | |
| 2022/0058773 | A1 | 2/2022 | Chou et al. | |
| 2022/0070585 | A1 | 3/2022 | Chen | |
| 2022/0124444 | A1 | 4/2022 | Andersen | |
| 2022/0232331 | A1 | 7/2022 | Jelcicova | |
| 2023/0034525 | A1 | 2/2023 | Scheller | |

OTHER PUBLICATIONS

D. Markovic, et al. "Implicit Neural Spatial Filtering for Multichannel Source Separation in the Waveform Domain", Meta, Reality Labs Research, Pittsburgh PA, USA, Metal AI Research, Paris, France, Jun. 30, 2022, 5 pages.

* cited by examiner

EAR-WORN DEVICE WITH NEURAL NETWORK FOR NOISE REDUCTION AND/OR SPATIAL FOCUSING USING MULTIPLE INPUT AUDIO SIGNALS

CROSS-REFERENCED TO RELATED APPLICATIONS

This application is a Continuation of U.S. Ser. No. 18/592,720, filed Mar. 1, 2024; which is a Continuation of U.S. Ser. No. 18/477,087, filed Sep. 28, 2023, now U.S. Pat. No. 11,937,047; which claims priority to U.S. Provisional Ser. No. 63/517,755, filed Aug. 4, 2023; which are incorporated herein by reference.

BACKGROUND

Field

The present disclosure relates to an ear-worn device, such as a hearing aid.

Related Art

Hearing aids are used to help those who have trouble hearing to hear better. Typically, hearing aids amplify received sound. Some hearing aids attempt to enhance incoming sound.

SUMMARY

According to one aspect, an ear-worn device includes: two or more microphones configured to generate time-domain audio signals, each of the two or more microphones configured to generate one of the time-domain audio signals; processing circuitry including analog processing circuitry, digital processing circuitry, beamforming circuitry, and short-time Fourier transformation (STFT) circuitry, the processing circuitry configured to generate, from the time-domain audio signals, one or more frequency-domain non-beamformed audio signals and one or more frequency-domain beamformed signals; and enhancement circuitry including neural network circuitry configured to: receive multiple frequency-domain input audio signals originating from the one or more frequency-domain non-beamformed audio signals and the one or more frequency-domain beamformed signals; and implement a single neural network trained to generate, based on the multiple frequency-domain input audio signals, a noise-reduced and spatially-focused output audio signal or an output for generating a noise-reduced and spatially-focused output audio signal.

According to one aspect, an ear-worn device, includes two or more microphones configured to generate time-domain audio signals, each of the two or more microphones configured to generate one of the time-domain audio signals; processing circuitry including analog processing circuitry, digital processing circuitry, beamforming circuitry, and short-time Fourier transformation (STFT) circuitry, the processing circuitry configured to generate, from the time-domain audio signals, either or both of one or more frequency-domain non-beamformed audio signals and one or more frequency-domain beamformed signals; and enhancement circuitry including neural network circuitry configured to: receive multiple frequency-domain input audio signals originating from either or both of the one or more frequency-domain non-beamformed audio signals and the one or more frequency-domain beamformed signals; and implement a single neural network trained to generate, based on the multiple frequency-domain input audio signals, a noise-reduced and spatially-focused output audio signal or an output for generating a noise-reduced and spatially-focused output audio signal.

According to one aspect, an ear-worn device includes two or more microphones configured to generate time-domain audio signals, each of the two or more microphones configured to generate one of the time-domain audio signals; processing circuitry including analog processing circuitry, digital processing circuitry, beamforming circuitry, and short-time Fourier transformation (STFT) circuitry, the processing circuitry configured to generate, from the time-domain audio signals, either or both of one or more frequency-domain non-beamformed audio signals and one or more frequency-domain beamformed signals; and enhancement circuitry including neural network circuitry configured to: receive multiple frequency-domain input audio signals originating from either or both of the one or more frequency-domain non-beamformed audio signals and the one or more frequency-domain beamformed signals; and implement a neural network trained to generate, based on the multiple frequency-domain input audio signals, a noise-reduced output audio signal or an output for generating a noise-reduced output audio signal.

According to one aspect, an ear-worn device includes two or more microphones configured to generate time-domain audio signals, each of the two or more microphones configured to generate one of the time-domain audio signals; processing circuitry including analog processing circuitry, digital processing circuitry, beamforming circuitry, and short-time Fourier transformation (STFT) circuitry, the processing circuitry configured to generate, from the time-domain audio signals, either or both of one or more frequency-domain non-beamformed audio signals and one or more frequency-domain beamformed signals; and enhancement circuitry including neural network circuitry configured to: receive multiple frequency-domain input audio signals originating from either or both of the one or more frequency-domain non-beamformed audio signals and the one or more frequency-domain beamformed signals; and implement a neural network trained to generate, based on the multiple frequency-domain input audio signals, a spatially-focused output audio signal or an output for generating a spatially-focused output audio signal.

According to one aspect, an ear-worn device includes two or more microphones configured to generate audio signals, each of the two or more microphones configured to generate one of the audio signals; processing circuitry including analog processing circuitry, digital processing circuitry, beamforming circuitry, the processing circuitry configured to generate, from the time-domain audio signals, either or both of one or more non-beamformed audio signals one or more beamformed signals; and enhancement circuitry including neural network circuitry configured to: receive multiple input audio signals originating from either or both of the one or more non-beamformed audio signals the one or more beamformed signals; and implement a neural network trained to generate, based on the multiple input audio signals, a noise-reduced and spatially-focused output audio signal or an output for generating a noise-reduced and spatially-focused output audio signal.

According to one aspect, an ear-worn device, includes two or more microphones configured to generate audio signals, each of the two or more microphones configured to generate one of the audio signals; processing circuitry including analog processing circuitry, digital processing circuitry, beamforming circuitry, the processing circuitry configured to generate, from the time-domain audio signals, either or both of one or more non-beamformed audio signals and one or more beamformed signals; and enhancement circuitry including neural network circuitry configured to: receive multiple input audio signals originating from either or both of the one or more non-beamformed audio signals and the one or more beamformed signals; and implement a neural network trained to generate, based on the multiple input audio signals, a noise-reduced output audio signal or an output for generating a noise-reduced output audio signal.

According to one aspect, an ear-worn device includes two or more microphones configured to generate audio signals, each of the two or more microphones configured to generate one of the audio signals; processing circuitry including analog processing circuitry, digital processing circuitry, beamforming circuitry, the processing circuitry configured to generate, from the time-domain audio signals, either or both of one or more non-beamformed audio signals and one or more beamformed signals; and enhancement circuitry including neural network circuitry configured to: receive multiple input audio signals originating from either or both of the one or more non-beamformed audio signals and the one or more beamformed signals; and implement a neural network trained to generate, based on the multiple input audio signals, a spatially-focused output audio signal or an output for generating a spatially-focused output audio signal.

According to one aspect, an ear-worn device, includes two or more microphones configured to generate time-domain audio signals, each of the two or more microphones configured to generate one of the time-domain audio signals; and enhancement circuitry including neural network circuitry configured to receive multiple frequency-domain input audio signals originating from the time-domain audio signals and implement a neural network trained to generate, based on the multiple frequency-domain input audio signals, a noise-reduced and spatially-focused output audio signal or an output for generating a noise-reduced and spatially-focused output audio signal.

According to one aspect, an ear-worn device, includes two or more microphones configured to generate time-domain audio signals, each of the two or more microphones configured to generate one of the time-domain audio signals; enhancement circuitry including neural network circuitry configured to receive multiple frequency-domain input audio signals originating from the time-domain audio signals and implement a neural network trained to generate, based on the multiple frequency-domain input audio signals, a noise-reduced output audio signal or an output for generating a noise-reduced output audio signal.

According to one aspect, an ear-worn device, includes two or more microphones configured to generate time-domain audio signals, each of the two or more microphones configured to generate one of the time-domain audio signals; and enhancement circuitry including neural network circuitry configured to receive multiple frequency-domain input audio signals originating from the time-domain audio signals and implement a neural network trained to generate, based on the multiple frequency-domain input audio signals, a spatially-focused output audio signal or an output for generating a spatially-focused output audio signal.

According to one aspect, an ear-worn device, includes two or more microphones configured to generate microphone audio signals, each of the two or more microphones configured to generate one of the microphone audio signals; and enhancement circuitry including neural network circuitry configured to receive multiple input audio signals originating from the microphone audio signals and implement a neural network trained to generate, based on the multiple input audio signals, a noise-reduced and spatially-focused output audio signal or an output for generating a noise-reduced and spatially-focused output audio signal.

According to one aspect, an ear-worn device includes two or more microphones configured to generate microphone audio signals, each of the two or more microphones configured to generate one of the microphone audio signals; and enhancement circuitry including neural network circuitry configured to receive multiple input audio signals originating from the microphone audio signals and implement a neural network trained to generate, based on the multiple input audio signals, a noise-reduced output audio signal or an output for generating a noise-reduced output audio signal.

According to one aspect, an ear-worn device, includes two or more microphones configured to generate microphone audio signals, each of the two or more microphones configured to generate one of the microphone audio signals; and enhancement circuitry including neural network circuitry configured to receive multiple input audio signals originating from the microphone audio signals and implement a neural network trained to generate, based on the multiple input audio signals, a noise-reduced and spatially-focused output audio signal or an output for generating a noise-reduced and spatially-focused output audio signal.

In some embodiments of any of the above aspects, the one or more frequency-domain beamformed signals include a frequency-domain beamformed signal having a dipole, hypercardioid, supercardioid, or cardioid directional pattern.

In some embodiments of any of the above aspects, the two or more microphones include a front microphone and a back microphone, and the one of more frequency-domain non-beamformed audio signals include a frequency-domain non-beamformed audio signal originating from the front microphone and a frequency-domain non-beamformed audio signal originating from the back microphone.

In some embodiments of any of the above aspects, the single neural network includes a recurrent network.

In some embodiments of any of the above aspects, the ear-worn device further includes interpolation circuitry configured to interpolate between 1. one of the multiple frequency-domain input audio signals, and 2. the noise-reduced and spatially-focused output, or a processed version thereof.

In some embodiments of any of the above aspects, the noise-reduced and spatially-focused output audio signal uses a mapping of gains to respective spatial regions. In some embodiments of any of the above aspects, the mapping is predetermined. In some embodiments of any of the above aspects, the mapping of the gains to the respective spatial regions includes applying a gain of 1 to audio generated from sounds coming from a target spatial region and applying a gain of 0 to audio generated from sounds coming from other spatial regions. In some embodiments of any of the above aspects, the target spatial region has an angle relative to a wearer of the ear-worn device of approximately equal to or between 10-180 degrees. In some embodiments of any of the above aspects, the mapping of the gains to the respective spatial regions includes mapping more than two spatial regions each to a different gain, and one or more of the spatial regions are processed with gains not equal to 1 or 0. In some embodiments of any of the above aspects, the mapping is not predetermined. In some embodiments of any of the above aspects, the output for generating the noise-reduced and spatially-focused output audio signal includes a sound map indicating frequency components originating from each of multiple spatial regions. In some embodiments of any of the above aspects, the enhancement circuitry is further configured to apply a beam pattern to the sound map, and the beam pattern is based on a selection from a wearer of the ear-worn device. In some embodiments of any of the above aspects, the selection from the wearer of the ear-worn device includes a selection of a size of a front-facing spatial region to use for focusing. In some embodiments of any of the above aspects, the output for generating the noise-reduced and spatially-focused output audio signal includes values calculated for a metric from audio from the multiple beams, each of the multiple beams pointing at a different angle around a wearer of the ear-worn device, and the enhancement circuitry is configured to combine the audio from the multiple beams using the values for the metric.

In some embodiments of any of the above aspects, the neural network is trained on both captured data and synthetic data.

In some embodiments of any of the above aspects, the ear-worn device further includes an inertial measurement unit (IMU) and second processing circuitry configured to track head movements of a wearer of the ear-worn device using measurements from the IMU and cause an absolute coordinate system to be used for the spatial focusing based on the head movements.

In some embodiments of any of the above aspects, the processing circuitry is coupled between the two or more microphones and the enhancement circuitry; the analog processing circuitry is coupled between the two or more microphones and the digital processing circuitry; the digital processing circuitry is coupled between the analog processing circuitry and the beamforming circuitry; the beamforming circuitry is coupled between the digital processing circuitry and the STFT circuitry; the analog processing circuitry is configured to perform one or more of analog preamplification, analog filtering, and analog-to-digital conversion; and the digital processing circuitry is configured to perform one or more of wind reduction, input calibration, and anti-feedback processing.

In some embodiments of any of the above aspects, the processing circuitry is coupled between the two or more microphones and the enhancement circuitry; the analog processing circuitry is coupled between the two or more microphones and the digital processing circuitry; the digital processing circuitry is coupled between the analog processing circuitry and the STFT circuitry; the STFT circuitry is coupled between the digital processing circuitry and the beamforming circuitry; the analog processing circuitry is configured to perform one or more of analog preamplification, analog filtering, and analog-to-digital conversion; and the digital processing circuitry is configured to perform one or more of wind reduction, input calibration, and anti-feedback processing.

In some embodiments of any of the above aspects, the neural network circuitry is configured to output a single output based on the multiple frequency-domain input audio signals.

According to one aspect, an ear-worn device is configured to collect audio from multiple beams, each of the multiple beams pointing at a different angle around a wearer of the ear-worn device; calculate values for a metric from the audio from the multiple beams; and combine the audio from the multiple beams using the values for the metric. In some embodiments, the ear-worn device includes neural network circuitry configured to implement a neural network trained to calculate the values for the metric. In some embodiments, the metric includes signal-to-noise ratio. In some embodiments, the metric includes speaker power.

According to on aspect, an ear-worn device includes an inertial measurement unit (IMU) and second processing circuitry configured to track head movements of a wearer of the ear-worn device using measurements from the IMU and cause an absolute coordinate system to be used for the spatial focusing based on the head movements.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
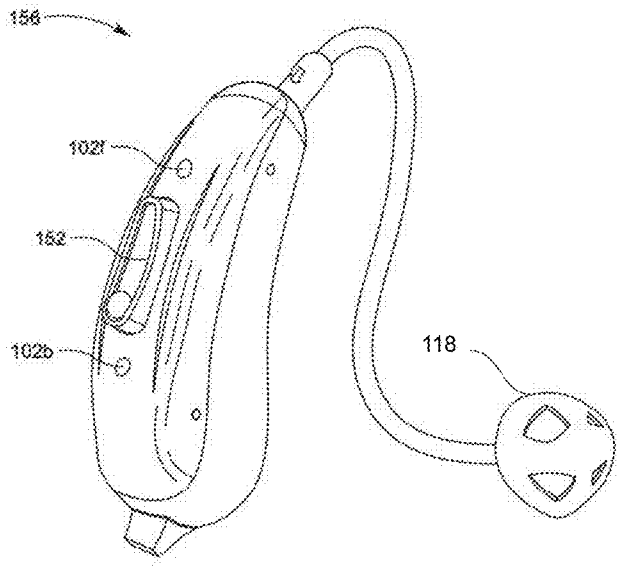
FIG. 1 illustrates a hearing aid, in accordance with certain embodiments described herein.

Reducing noise in the output of hearing aids and other ear-worn devices is a difficult challenge. Reducing noise in scenarios in which the wearer is listening to one speaker while there are other interfering speakers in the vicinity is a particularly difficult challenge. Recently, neural networks for separating speech from noise have been developed. Further description of such neural networks for reducing noise may be found in U.S. Patent App. Pub. No. US20230232169A1, titled "Method, Apparatus and System for Neural Network Hearing Aid," published on Jul. 20, 2023 and based on an application filed on Jan. 14, 2022, which is incorporated by reference herein in its entirety.

The inventors have recognized that neural networks that accept two more input audio signals originating from two or more microphones on an ear-worn device may be better able to reduce noise and sound from interfering speakers. For general noise reduction, the inventors have recognized that if, at a previous time step, the neural network heard noise coming from a certain direction-of-arrival (DOA), the neural network may have a prior to cancel out noise from that DOA on the current time step. From another perspective, sound sources tend to move slowly with time so if the neural network has identified a particular segment of sound as speech and knows its DOA, the neural network may reasonably infer that other sounds from the same direction are also speech.

For reducing sound from interfering speakers, conventional ear-worn devices may use beamforming to focus on sound received from certain directions and attenuate sounds received from other directions. This may involve processing sounds from different microphones in different ways (e.g., applying different delays to the signals received at different microphones). Conventional beamforming (both adaptive and non-adaptive) may provide an intelligibility boost, because it may enable focusing on sounds coming from in front of the wearer (from where it is assumed that sounds of interest originate) and attenuate sounds (e.g., background noise and interfering speakers) on the sides and back of the wearer.

However, conventional beamforming patterns (e.g., cardioids, supercardioids, hypercardiods, and dipoles) may also have shortcomings, including: 1. A theoretical beamforming pattern may become warped once it is implemented by microphones placed on a behind-the-ear hearing aid, due at least in part to interference from the head, torso, and ear of the wearer; this may cause performance to suffer. 2. In reverberant environments, the indirect path may come through from the front-facing direction. For example, in a reverberant room, when a speaker is talking from directly behind the wearer, that speaker's voice may reverberate all around the room and enter the hearing aid microphones from in front of the wearer; such sounds may not be attenuated by a front-facing beamforming pattern. 3. Conventional beamforming may work better on high-frequency sounds than low-frequency sounds. In other words, conventional beamforming may be better at using high-frequency sounds for sound localization than low-frequency sounds. 4. Generally, there is a limit to how much sound reduction conventional beamforming patterns can provide.

The inventors have addressed these shortcomings by developing neural networks that perform spatial focusing. Spatial focusing may include applying different gains to audio signals based on the locations of the sources of the sounds from which the audio signals were generated. The locations of the sounds may be derived from differences in timing of the sounds arriving at multiple microphones. The inventors have recognized that with a single microphone, speakers from different directions may sound the same to a neural network; in other words, a neural network may not be able to tell whether a speaker is in front of the wearer or behind the wearer (or, in general, where a wearer is located). A neural network using inputs from multiple microphones may break this ambiguity. Thus, the neural network may accept multiple input audio signals originating from two or more microphones on an ear-worn device and be trained to perform spatial focusing (in some embodiments, in addition to performing noise reduction), which may help to focus on sounds coming from a target direction and reduce sound coming from other directions. As one particular example, focusing on sounds originating from in front of the ear-worn device wearer may help to reduce sound from interfering speakers located behind and to the sides of the ear-worn device wearer; other target directions may be used as well.

Generally, the inventors have developed neural networks that may accept two or more input audio signals originating from two or more microphones on an ear-worn device and that may provide a significantly larger increase in signal-to-noise ratio (SNR) and higher-performance speaker isolation than achievable with conventional noise reduction and/or beamforming techniques. Thus, these neural networks may be trained to perform noise reduction, spatial focusing, or both. Additionally, the inventors have developed different methods for how such neural networks may perform spatial focusing, including methods for mapping gains to respective spatial regions from which sounds originated, methods for generating sound maps and applying beam patterns using the sound maps, and methods for collecting sound using multiple beams around the wearer and weighting the sound using a metric such as SNR. Additionally, the inventors have developed different graphical user interfaces (GUIs) for a processing device (e.g., a smartphone or tablet) in operative communication with an ear-worn device; a wearer may use these GUIs to control spatial focusing performed by the ear-worn device. The neural networks may have sufficiently low latencies to enable implementation of the neural networks in an ear-worn device. In some embodiments, a single recurrent neural network may be used in conjunction with frequency-domain processing, which may be helpful for realizing low latencies.

FIG. 1 illustrates a hearing aid 156, in accordance with certain embodiments described herein. The hearing aid 156 may be any of the ear-worn devices or hearing aids described herein. The hearing aid 156 includes a front microphone 102*f*, a back microphone 102*b*, a user input device 152, and a receiver 118. When the hearing aid 156 is worn, the front microphone 102*f* may be closer to the front of the wearer and the back microphone may be closer to the back of the wearer. The user input device 152 may be configured for controlling certain functions of the hearing aid 156, such as volume, activation of neural network circuitry (e.g., any of the neural network circuitry described below), etc. A processing device (e.g., a smartphone or tablet) in operative communication with the hearing aid 156 may also be used by the wearer to control certain functions of the hearing aid 156. Any of the data paths described below may be implemented in the hearing aid 156. In particular, as described above, certain embodiments described herein include neural networks that accept two or more input audio signals originating from two or more microphones. The two or more microphones may be the front microphone 102*f* and the back microphone 102*b* of the hearing aid 156.

Figure 2:
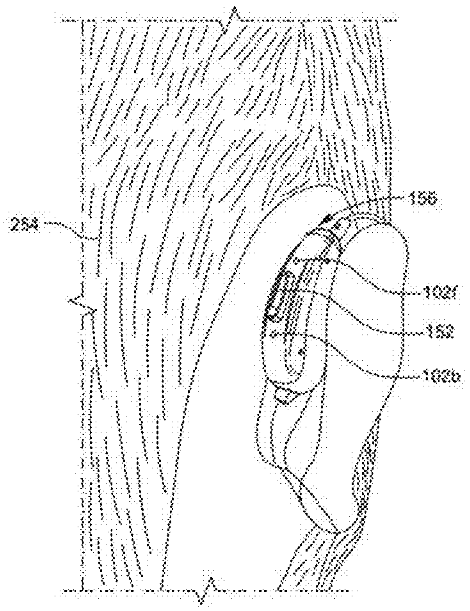
FIG. 2 illustrates the hearing aid of FIG. 1 on a wearer, in accordance with certain embodiments described herein.

FIG. 2 illustrates the hearing aid 156 on a wearer 254, in accordance with certain embodiments described herein. FIG. 2 shows the wearer 254 from the back, and as illustrated, the front microphone 102*f* is closer to the front of the wearer 254 and the back microphone 102*b* is closer to the back of the wearer 254. While FIGS. 1 and 2 illustrate a behind-the-ear hearing aid, hearing aids with other form factors may be used as well.

Figure 3:
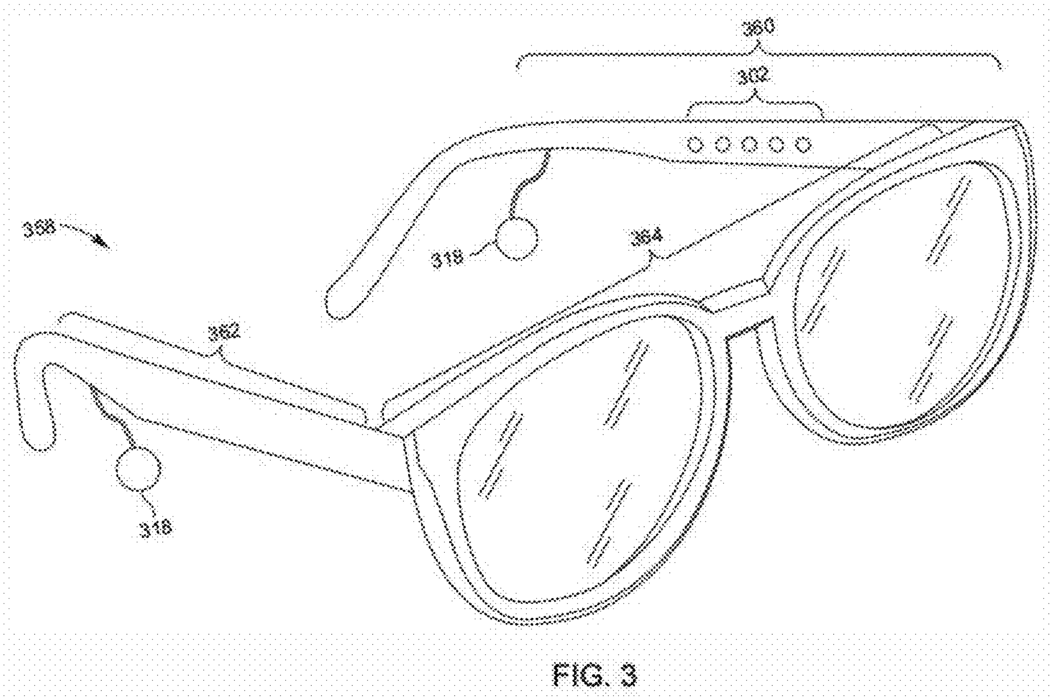
FIG. 3 illustrates eyeglasses including built-in hearing aids, in accordance with certain embodiments described herein.

FIG. 3 illustrates eyeglasses 358 including built-in hearing aids, in accordance with certain embodiments described herein. The eyeglasses 358 may be any of the ear-worn devices or hearing aids described herein. The eyeglasses 358 have a left temple 360, a right temple 362, and a front rim 364. The eyeglasses 358 further include receivers 318 connected to each of the left temple 360 and the right temple 362. FIG. 3 illustrates microphones 302 disposed on the left temple 360. It should be appreciated that microphones 302 may also be disposed on the right temple 360 (but not visible in the figure). It should also be appreciated that microphones 302 may also be disposed on the front rim 364 (but not visible in the figure). While FIG. 3 illustrates five microphones on the left temple 360, more or fewer microphones may be disposed on a temple or rim. In some embodiments (such as that of FIG. 3), the inlets for the microphones 302 may be disposed on the inner side of the temples and/or rim (i.e., the side facing toward the wearer's face), thereby reducing visibility of the inlets to other people. In some embodiments, the inlets for the microphones 302 may be disposed on the upper side of the temples and/or rim, thereby reducing visibility of the inlets to other people. In some embodiments, the inlets for the microphones 302 may be disposed on the outer side of the temples and/or rim (i.e., the side facing away from the wearer's face). Any of the data paths described below may be implemented in the eyeglasses 358. In particular, as described above, certain embodiments described herein include neural networks that accept two or more input audio signals originating from two or more microphones. The two or more microphones may be the microphones 302 of the eyeglasses 358. It should be appreciated that while FIGS. 1-3 illustrate a hearing aid and eyeglasses, other ear-worn devices such as cochlear implants or earphones may be used as well.

Figure 4:
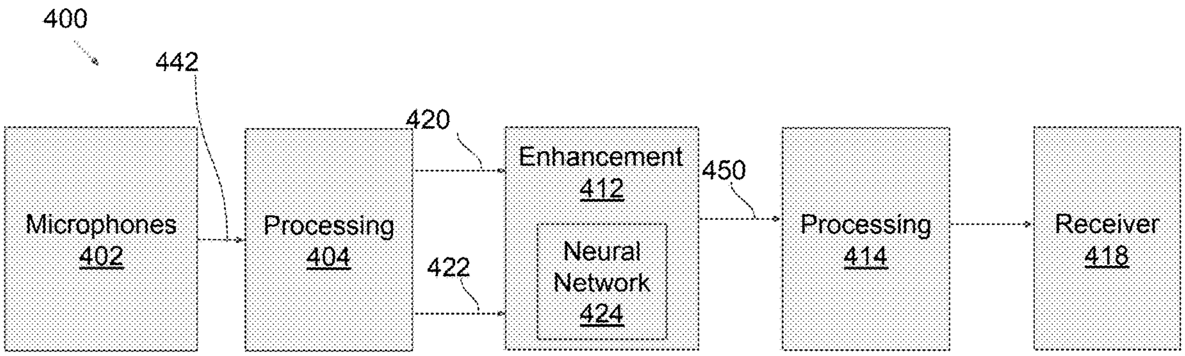
FIG. 4 illustrates a data path in an ear-worn device, in accordance with certain embodiments described herein.

FIG. 4 illustrates a data path 400 in an ear-worn device (e.g., a hearing aid, such as the hearing aid 156 and/or the eyeglasses 358 described above), in accordance with certain embodiments described herein. The data path 400 includes microphones 402, processing circuitry 404, enhancement circuitry 412, processing circuitry 414, and a receiver 418. The enhancement circuitry 412 includes neural network circuitry 424. It should be appreciated that the data path 400 may include more circuitry and components than shown (e.g., anti-feedback circuitry, calibration circuitry, etc.) and such circuitry and components may be disposed between certain of the circuitry and components illustrated in FIG. 4.

In the data path 400, the processing circuitry 404 is coupled between the microphones 402 and the enhancement circuitry 412. The enhancement circuitry 412 is coupled between the processing circuitry 404 and the processing circuitry 414. The processing circuitry 414 is coupled between the enhancement circuitry 412 and the receiver 418. As referred to herein, if element A is described as coupled between element B and element C, there may be other elements between elements A and B and/or between elements A and C.

The microphones 402 may include two or more (e.g., 2, 3, 4, or more) microphones. For example, the microphones 402 may include two microphones, a front microphone that is closer to the front of the wearer of the ear-worn device and a back microphone that is closer to the back of the wearer of the ear-worn device (e.g., as in the hearing aid 156). As another example, the microphones AAA02 may include more than two microphones in an array (e.g., as in the eyeglasses 358). As another example, one microphone may be on a first ear-worn device and one microphone may be on a second ear-worn device coupled wirelessly to the first ear-worn device. The microphones 402 may be configured to receive sound signals and generate time-domain audio signals 442 from the sound signals. The time-domain audio signals 442 may represent multiple individual audio signals, each generated by one of the microphones 402. Thus, each of the time-domain audio signals 442 may originate from one of the microphones 402.

In some embodiments, the processing circuitry 404 may include analog processing circuitry. The analog processing circuitry may be configured to perform analog processing on the time-domain audio signals 442 received from the microphones 402. For example, the analog processing circuitry may be configured to perform one or more of analog preamplification, analog filtering, and analog-to-digital conversion. Thus, the analog processing circuitry may be configured to generate analog-processed time-domain audio signals from the time-domain audio signals 442. The analog-processed time-domain audio signals may include multiple individual signals, each an analog-processed version of one of the time-domain audio signals 442. As referred to herein, analog processing circuitry may include analog-to-digital conversion circuitry, and an analog-processed signal may be a digital signal that has been converted from analog to digital by analog-to-digital conversion circuitry.

In some embodiments, the processing circuitry 404 may include digital processing circuitry. The digital processing circuitry may be configured to perform digital processing on the analog-processed time-domain audio signals received from the analog processing circuitry. For example, the digital processing circuitry may be configured to perform one or more of wind reduction, input calibration, and anti-feedback processing. Thus, the digital processing circuitry may be configured to generate digital-processed time-domain audio signals from the analog-processed time-domain audio signals. The digital-processed time-domain audio signals may include multiple individual signals, each a digital-processed version of one of the analog-processed time-domain audio signals In some embodiments, the processing circuitry 404 may include beamforming circuitry. In some embodiments, the beamforming circuitry may be configured to operate in the time domain, and the enhancement circuitry 412 may be configured to operate in the frequency domain. In such embodiments, STFT circuitry in the processing circuitry 412 may be coupled between the beamforming circuitry and the enhancement circuitry 412, and the beamforming circuitry may be configured to perform beamforming on two or more of the digital-processed time-domain audio signals received from the digital processing circuitry. Thus, the beamforming circuitry may be configured to generate one or more time-domain beamformed audio signals from two or more of the digital-processed time-domain audio signals. The time-domain beamformed audio signals may include one or more individual signals, each a beamformed version of two or more digital-processed time-domain audio signals. Beamforming will be described in further detail below.

The STFT circuitry may be configured to perform STFT on one or more of the time-domain beamformed audio signals and/or one or more of the digital-processed time-domain audio signals. The STFT may convert a signal within a short time window (e.g., on the order of milliseconds) from a time-domain signal into a frequency-domain signal. Thus, the STFT circuitry may be configured to generate one or more frequency-domain beamformed audio signals 422 from the time-domain beamformed audio signals and to generate one or more frequency-domain non-beamformed audio signals 420 from one or more of the digital-processed time-domain (non-beamformed) audio signals. The one or more frequency-domain beamformed audio signals 422 may include one or more individual signals, each a frequency-domain version of one of the time-domain beamformed signals. The one or more frequency-domain non-beamformed audio signals 420 may include one or more individual signals, each a frequency-domain version of one of the digital-processed time-domain signals.

In some embodiments, the beamforming circuitry may be configured to operate in the frequency domain, and the enhancement circuitry 412 may be configured to operate in the frequency domain. In such embodiments, the STFT circuitry may be coupled between the processing circuitry 404 and the beamforming circuitry. The STFT circuitry may be configured to perform STFT on the digital-processed time-domain audio signals received from the digital processing circuitry. The STFT may convert a signal within a short time window (e.g., on the order of milliseconds) from a time-domain signal into a frequency-domain signal. Thus, the STFT circuitry may be configured to generate one or more frequency-domain non-beamformed audio signals 420 from the digital-processed time-domain audio signals. The one or more frequency-domain non-beamformed audio signals 420 may include one or more individual signals, each a frequency-domain version of one of the digital-processed time-domain signals. The beamforming circuitry may be configured to perform beamforming on two or more of the frequency-domain non-beamformed audio signals received from the STFT circuitry. Thus, the beamforming circuitry may be configured to generate one or more frequency-domain beamformed audio signals 422 from two or more of the frequency-domain non-beamformed audio signals. The frequency-domain beamformed audio signals 422 may include one or more individual signals, each a beamformed version of two or more frequency-domain non-beamformed audio signals. Beamforming will be described in further detail below.

Thus, in some embodiments (e.g., when the beamforming circuitry is configured to operate on time-domain signals), the analog processing circuitry may be coupled between the two or more microphones and the digital processing circuitry, the digital processing circuitry may be coupled between the analog processing circuitry and the beamforming circuitry, and the beamforming circuitry may be coupled between the digital processing circuitry and the STFT circuitry. In some embodiments (e.g., when the beamforming circuitry is configured to operate on frequency-domain signals), the analog processing circuitry may be coupled between the two or more microphones and the digital processing circuitry, the digital processing circuitry may be coupled between the analog processing circuitry and the STFT circuitry, and the STFT circuitry may be coupled between the digital processing circuitry and the beamforming circuitry.

The enhancement circuitry 412 includes the neural network circuitry 424 which may be configured to receive multiple input audio signals originating from the one or more frequency-domain non-beamformed audio signals 420 and the one or more frequency-domain beamformed audio signals 422. As referred to herein, a first signal may be said to originate from a second signal if the first signal is the same as the second signal or results from processing of the second signal. Thus, when this description describes that neural network circuitry 424, for example, receives first signals originating from second signals, it should be understood that in some embodiments, the neural network circuitry 424 may receive the second signals themselves. In some embodiments, the neural network circuitry 424 may receive processed versions of the second signals. As particular examples, in some embodiments, the multiple input audio signals received by the neural network circuitry 424 may be the one or more frequency-domain non-beamformed audio signals 420 and the one or more frequency-domain beamformed audio signals 422. In some embodiments, the multiple input audio signals received by the neural network circuitry 424 may be versions of the one or more frequency-domain non-beamformed audio signals 420 and the one or more frequency-domain beamformed audio signals 422 that have been processed further by the enhancement circuitry 412.

The neural network circuitry 424 may be configured to implement a neural network (e.g., a recurrent neural network) trained to perform noise reduction and/or spatial focusing. Thus, in some embodiments, the neural network may be trained to reduce noise (i.e., reduce non-speech). In some embodiments, the neural network may be trained to perform spatial focusing. In some embodiments, the neural network may be trained to both reduce noise and perform spatial focusing. It should be appreciated that a neural network may be considered trained to perform noise reduction even if the neural network itself does not generate a noise-reduced audio signal; a neural network that generates an output for use in generating a noise-reduced audio signal may still be considered trained to perform noise reduction. For example, the neural network may generate a mask that may be used to generate a noise-reduced audio signal. It should also be appreciated that a neural network may be considered trained to perform spatial focusing even if the neural network itself does not generate a spatially-focused audio signal; a neural network that generates an output for use in generating a spatially-focused audio signal may still be considered trained to perform spatial focusing. The output may be, as non-limiting examples, a mask for generating a spatially-focused audio signal, a sound map, a mask for generating a sound map, or values calculated for a metric from audio from multiple beams (each of the multiple beams pointing at a different angle around a wearer of the ear-worn device). In some embodiments, the neural network circuitry 424 may be configured to output a single output based on the multiple input audio signals. In some embodiments, the output 450 of the enhancement circuitry 412 may be the output of the neural network circuitry 424. In some embodiments, the output of the neural network circuitry 424 may undergo further processing (e.g., by the interpolation circuitry 1930 and/or the processing circuitry 1950 described below) prior to being outputted as the output 450 of the enhancement circuitry 412.

The processing circuitry 414 may be configured to perform further processing on the output 450 of the enhancement circuitry 412. For example, the processing circuitry 414 may include digital processing circuitry configured to perform one or more of wide-dynamic range compression and output calibration. Additionally, the processing circuitry 414 may include inverse STFT (iSTFT) circuitry configured to perform inverse STFT on the output of the digital processing circuitry. The iSTFT may be configured to convert a frequency-domain signal into a time-domain signal having a short time window.

The receiver 418 (which may be the same as the receivers 118 and/or 318) may be configured to play back the output of the iSTFT circuitry as sound into the ear of the user. The receiver 418 may also be configured to implement digital-to-analog conversion prior to the playing back.

In some embodiments, one or more of the processing circuitry 404, the enhancement circuitry 412 (including the neural network circuitry 424), and the processing circuitry 414 (or portions of any of the above) may be implemented on a single same chip (i.e., a single semiconductor die or substrate) in the ear-worn device. Further description of chips incorporating (among other elements) neural network circuitry for use in ear-worn devices may be found in U.S. patent application Ser. No. 18/232,854, entitled "Neural Network Chip for Ear-Worn Device," filed Aug. 11, 2023, which is incorporated by reference herein in its entirety.

Figure 5:
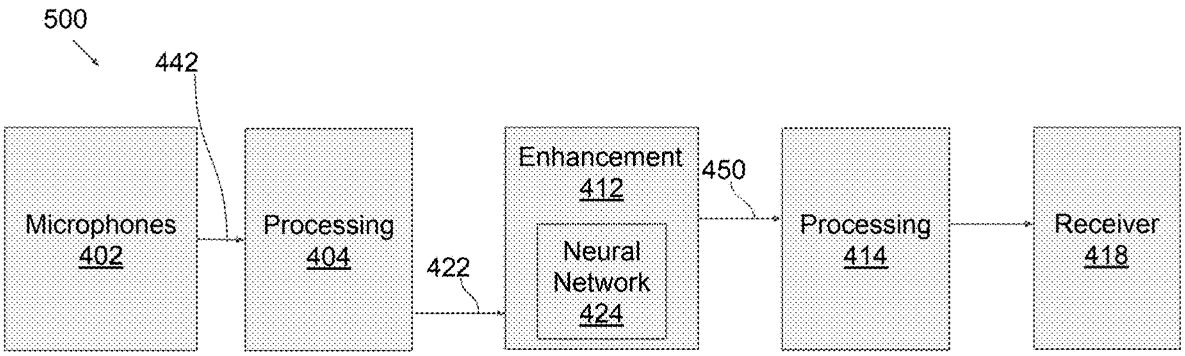
FIG. 5 illustrates a data path in an ear-worn device, in accordance with certain embodiments described herein.

FIG. 5 illustrates a data path 500 in an ear-worn device (e.g., a hearing aid, such as the hearing aid 156 and/or the eyeglasses 358 described above), in accordance with certain embodiments described herein. The data path 500 is the same as the data path 400, except that the neural network circuitry 424 is configured to receive multiple input audio signals originating from the one or more frequency-domain beamformed audio signals 422 but not the one or more frequency-domain non-beamformed audio signals 420.

Figure 6:
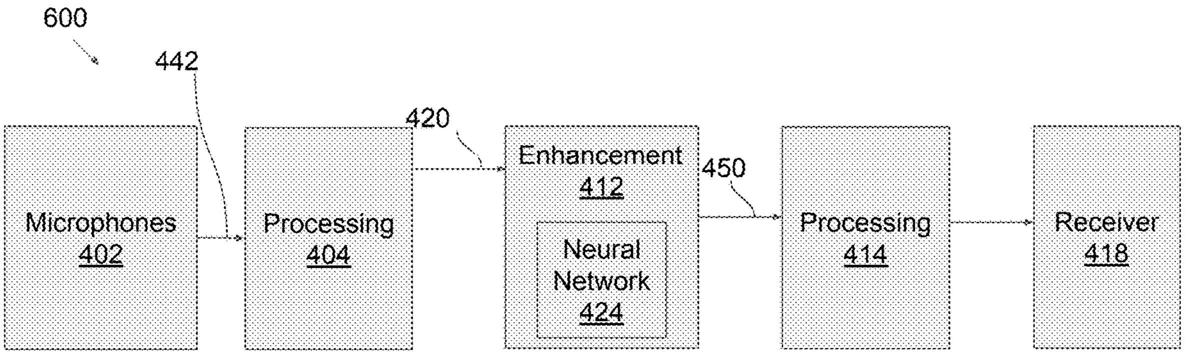
FIG. 6 illustrates a data path in an ear-worn device, in accordance with certain embodiments described herein.

FIG. 6 illustrates a data path 600 in an ear-worn device (e.g., a hearing aid, such as the hearing aid 156 and/or the eyeglasses 358 described above), in accordance with certain embodiments described herein. The data path 600 is the same as the data path 600, except that the neural network circuitry 424 is configured to receive multiple input audio signals originating from the one or more frequency-domain non-beamformed audio signals 420 but not the one or more frequency-domain beamformed audio signals 422. The processing circuitry 404 may not include beamforming circuitry in the data path 600.

It should be appreciated from the above description of the data paths 400, 500, and 600 that, in general, two or more microphones (e.g., the microphones 402) may be configured to generate time-domain audio signals, such that each of the two or more microphones is configured to generate one of the time-domain audio signals. Processing circuitry (e.g., the processing circuitry 404) may be configured to generate, from the time-domain audio signals, either or both of 1. one or more non-beamformed audio signals, and 2. one or more beamformed signals. Enhancement circuitry (e.g., the enhancement circuitry 412) may include neural network circuitry (e.g., the neural network circuitry 424) configured to receive multiple input audio signals originating from either or both of 1. the one or more non-beamformed audio signals, and 2. the one or more beamformed signals. In some embodiments, the multiple input audio signals may be frequency-domain signals. In some embodiments, the multiple input audio signals may be time-domain signals. As will be described further below, the neural network circuitry may be further configured to implement a neural network trained to perform noise reduction and/or spatial focusing. The neural network circuitry may be trained to generate a noise-reduced and/or spatially-focused output audio signal, or an output for generating a noise-reduced and/or spatially-focused output audio signal.

In some embodiments, the multiple input audio signals may include one frequency-domain beamformed signal. In some embodiments, the multiple input audio signals may include two frequency-domain beamformed signals. In some embodiments, the multiple input audio signals may include more than two (e.g., 3, 4, 5, or any other suitable number) frequency-domain beamformed signals. In some embodiments, the multiple input audio signals may include one frequency-domain non-beamformed signal. In some embodiments, the multiple input audio signals may include two frequency-domain non-beamformed signals. In some embodiments, the multiple input audio signals may include more than two (e.g., 3, 4, 5, or any other suitable number) frequency-domain non-beamformed signals. When the microphones 402 include a front microphone and a back microphone (e.g., as in the hearing aid 156), the one of more frequency-domain non-beamformed audio signals may include a frequency-domain non-beamformed audio signal originating from the front microphone and/or a frequency-domain non-beamformed audio signal originating from the back microphone.

Figure 7:
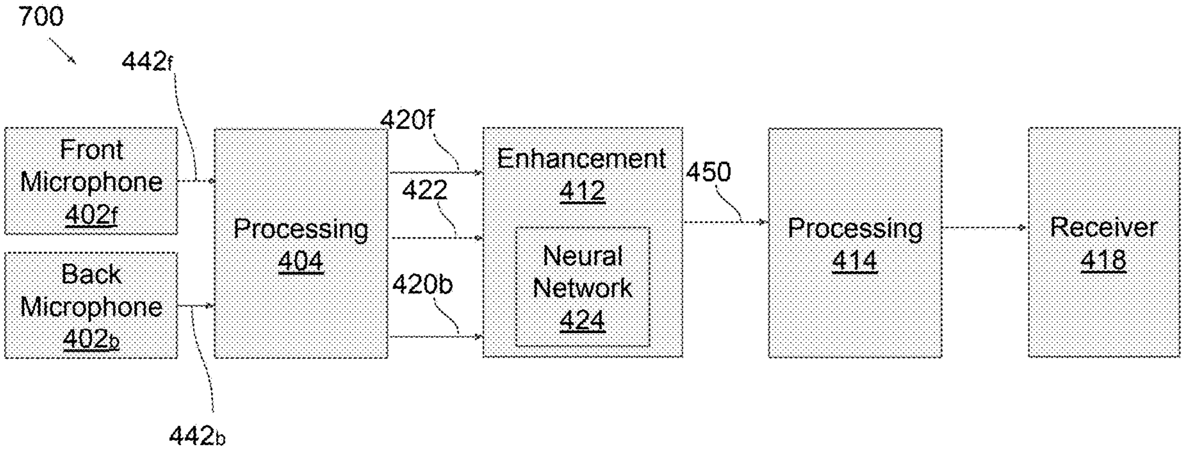
FIG. 7 illustrates a data path in an ear-worn device, in accordance with certain embodiments described herein.

FIG. 7 illustrates a data path 700 in an ear-worn device (e.g., a hearing aid, such as the hearing aid 156), in accordance with certain embodiments described herein. The data path 700 may be a specific version of the data path 400, in which the microphones 402 are a front microphone **402*f* (e.g., the front microphone 102*f*) and a back microphone 402*b* (e.g., the back microphone 102*b*). The front microphone 402*f* may be closer to the front of the wearer of the ear-worn device and the back microphone 402*b* may be closer to the back of the wearer of the ear-worn device. The front microphone 402*f* may be configured to generate a front time-domain audio signal 442*f* and the back microphone 402*b* may be configured to generate a back time-domain audio signal 442*b*. The processing circuitry 404 may be configured as described above to generate a front frequency-domain (non-beamformed) audio signal 420*f* originating from the front time-domain audio signal 442*f*, a back frequency-domain (non-beamformed) audio signal 420*b* originating from the back time-domain audio signal 442*b*, and one or more frequency-domain beamformed audio signals 422 originating from the front frequency-domain audio signal 420*f* and the back frequency-domain audio signal 420*b*. The neural network circuitry 724** is configured to receive multiple input audio signals originating from the front frequency-domain (non-beamformed) audio signal 420*f*, the back frequency-domain (non-beamformed) audio signal 420*b*, and the one or more frequency-domain beamformed audio signals 422.

Figure 8:
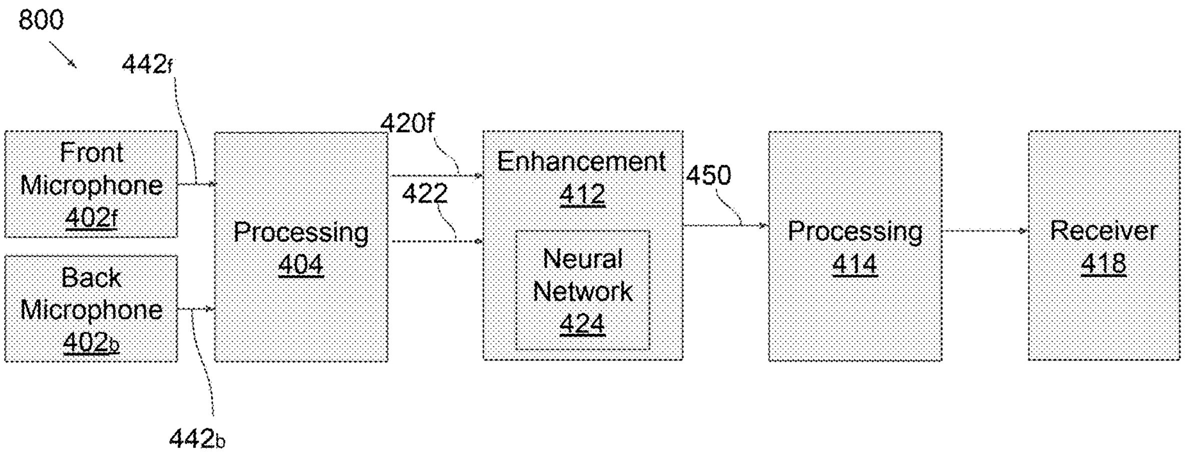
FIG. 8 illustrates a data path in an ear-worn device, in accordance with certain embodiments described herein.

FIG. 8 illustrates a data path 800 in an ear-worn device (e.g., a hearing aid, such as the hearing aid 156), in accordance with certain embodiments described herein. The data path 800 is the same as the data path 700, except that the neural network circuitry 424 is configured to receive multiple input audio signals originating from the front frequency-domain (non-beamformed) audio signal 420*f* and the one or more frequency-domain beamformed audio signals 422, but not the back frequency-domain audio signals 420*b*.

Figure 9:
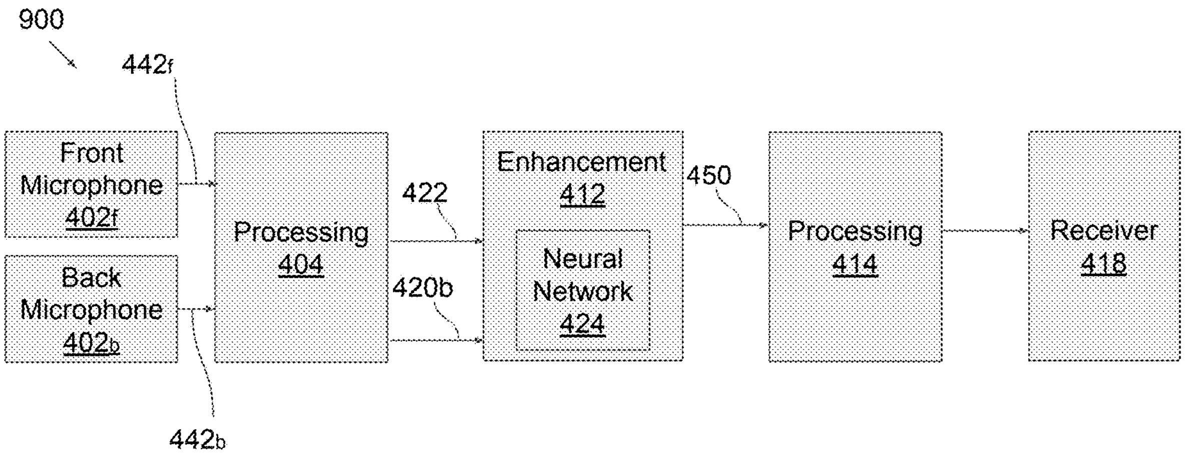
FIG. 9 illustrates a data path in an ear-worn device, in accordance with certain embodiments described herein.

FIG. 9 illustrates a data path 900 in an ear-worn device (e.g., a hearing aid, such as the hearing aid 156), in accordance with certain embodiments described herein. The data path 900 is the same as the data path 700, except that the neural network circuitry 424 is configured to receive multiple input audio signals originating from the back frequency-domain (non-beamformed) audio signal 420*b* and the one or more frequency-domain beamformed audio signals 422, but not the front frequency-domain audio signal 420*f*.

Figure 10:
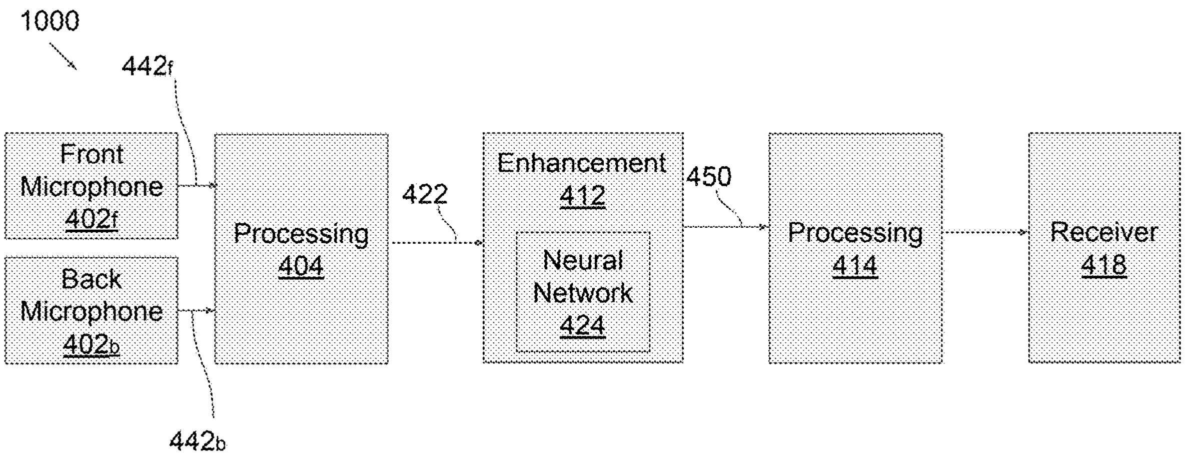
FIG. 10 illustrates a data path in an ear-worn device, in accordance with certain embodiments described herein.

FIG. 10 illustrates a data path 1000 in an ear-worn device (e.g., a hearing aid, such as the hearing aid 156), in accordance with certain embodiments described herein. The data path 1000 is the same as the data path 700, except that the neural network circuitry 424 is configured to receive multiple input audio signals originating from two or more of the frequency-domain beamformed audio signals 422, but not the front frequency-domain audio signal 420*f* or the back frequency-domain audio signal 420*b*.

Figure 11:
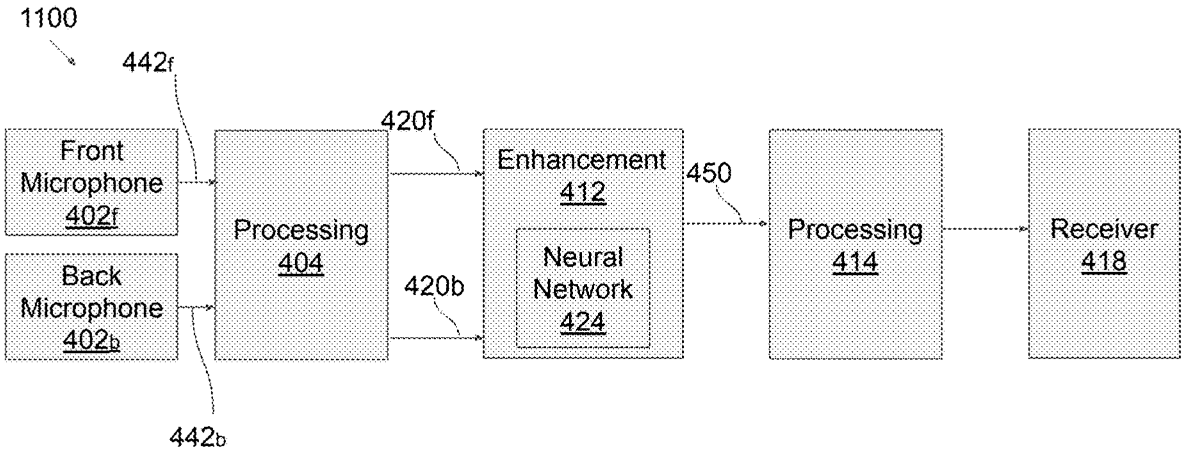
FIG. 11 illustrates a data path in an ear-worn device, in accordance with certain embodiments described herein.

FIG. 11 illustrates a data path 1100 in an ear-worn device (e.g., a hearing aid, such as the hearing aid 156), in accordance with certain embodiments described herein. The data path 1100 is the same as the data path 700, except that the neural network circuitry 424 is configured to receive multiple input audio signals originating from the front frequency-domain (non-beamformed) audio signal 420*f* and the back frequency-domain (non-beamformed) audio signal 420*b*, but not the frequency-domain beamformed audio signals 422. Additionally, beamforming circuitry may be absent from the processing circuitry 404 in the data path 1100.

In some embodiments, instead of or in addition to the example combinations of signals fed into the neural network circuitry 424 described above, signals that have undergone other processing may be fed into the enhancement circuitry. For example, processing circuitry not illustrated may calculate the difference between the front and back microphone signals at any stage of a data path, and once this difference signal has undergone processing by the rest of the data path, it may be fed to the neural network circuitry in addition to or instead of either or both of the front frequency-domain audio signal 420*f* and the back frequency-domain audio signal 420*b*. Additionally or alternatively, such a processed signal may be used to generate beamformed signals; for example, the front frequency-domain audio signal 420*f* and the difference between the front frequency-domain audio signal 420*f* and the back frequency-domain audio signal 420*b* may be used as inputs to beamforming circuitry.

According to one non-limiting embodiment, an ear-worn device includes two or more microphones; processing circuitry including analog processing circuitry, digital processing circuitry, beamforming circuitry, and STFT circuitry; enhancement circuitry that includes neural network circuitry; further processing circuitry; and a receiver. According to one non-limiting embodiment, an ear-worn device includes two or more microphones; processing circuitry including analog processing circuitry, digital processing circuitry, and beamforming circuitry; enhancement circuitry that includes neural network circuitry; further processing circuitry; and a receiver. According to one non-limiting embodiment, an ear-worn device includes two or more microphones; processing circuitry including analog processing circuitry, digital processing circuitry, and STFT circuitry; enhancement circuitry that includes neural network circuitry; further processing circuitry; and a receiver. According to one non-limiting embodiment, an ear-worn device includes two or more microphones; processing circuitry including analog processing circuitry and digital processing circuitry; enhancement circuitry that includes neural network circuitry; further processing circuitry; and a receiver.

In some embodiments of any of the data paths described herein, the enhancement circuitry 412 may be configured to operate on time-domain signals. Thus, the STFT circuitry and iSTFT circuitry may be absent in any of the data paths described herein, and the enhancement circuitry 412 may be configured to receive as inputs one or more time-domain audio signals (e.g., one or more non-beamformed audio signals and/or one or more time-domain beamformed audio signals).

Referring back to beamforming, beamforming may generally include applying delays (which should be understood to include a delay of 0) to one or more audio signals and summing (which should be understood to include subtracting) the delayed signals together. Different delays may be applied to signals originating from different microphones. In embodiments including just two microphones, namely a front microphone (e.g., the front microphone 102*f* and/or 402*f*) and a back microphone (e.g., the back microphone 102*b* and/or 402*b*), beamforming may include applying a delay to the signal from one of the microphones and subtracting the delayed signal from the signal from the other microphone. The resulting signal may have a directional pattern that depends, at least in part, on the spacing between the front microphone and the back microphone as well as the delay applied; in other words, the gain of the resulting signal may vary as a function of angle from the microphones. Examples of directional patterns include dipoles, hypercardioids, supercardioids, and cardioids. Certain directional patterns may generally attenuate signals coming from behind the wearer and not attenuate signals coming from in front of the wearer.

Figure 12:
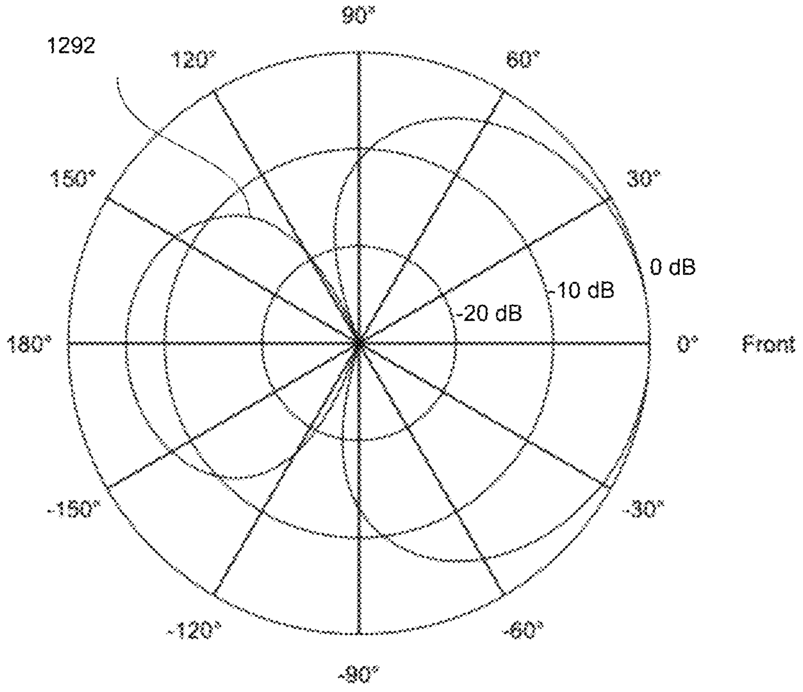
FIG. 12 illustrates a front-facing hypercardioid pattern, in accordance with certain embodiments described herein.
Figure 13:
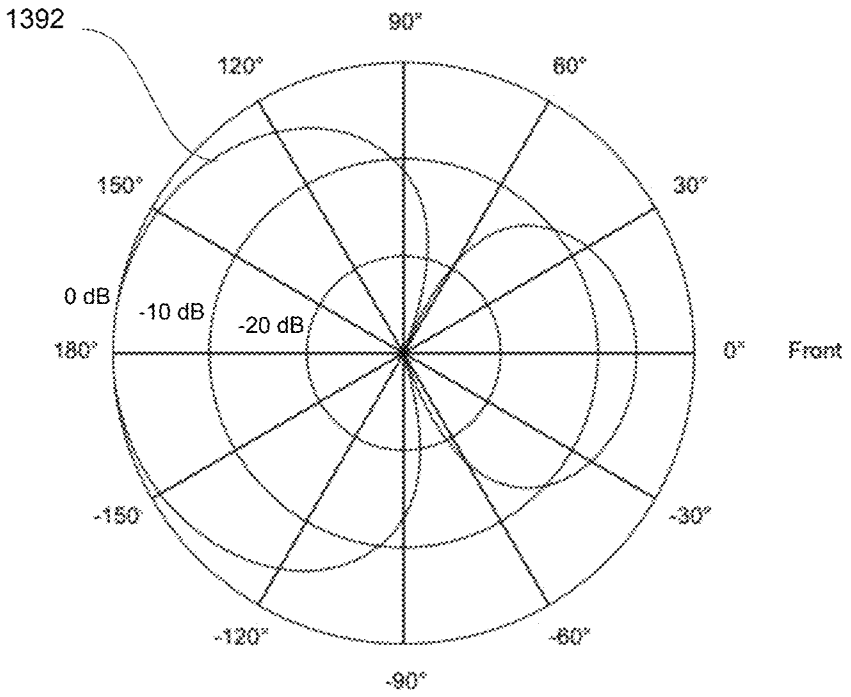
FIG. 13 illustrates a back-facing hypercardioid pattern, in accordance with certain embodiments described herein.
Figure 14:
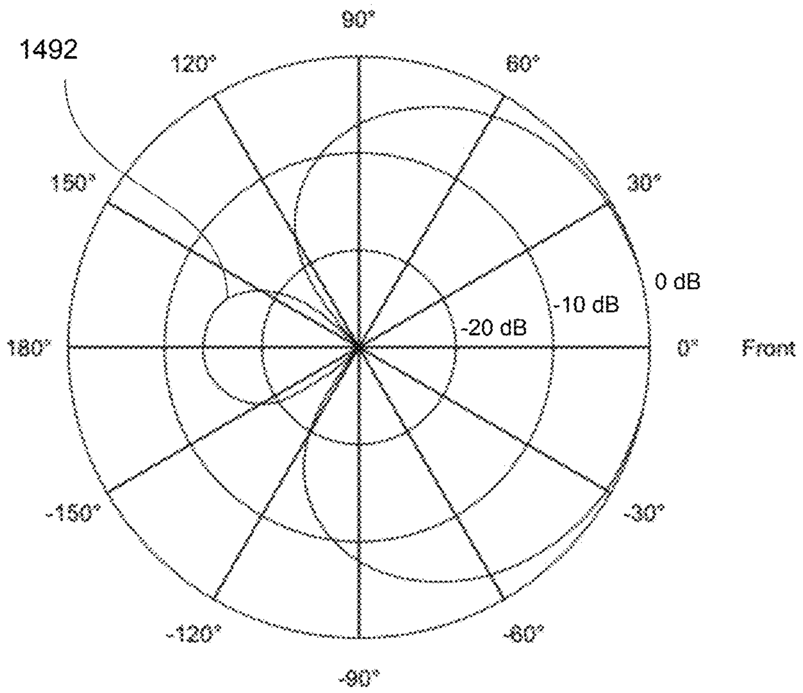
FIG. 14 illustrates a front-facing supercardioid pattern, in accordance with certain embodiments described herein.
Figure 15:
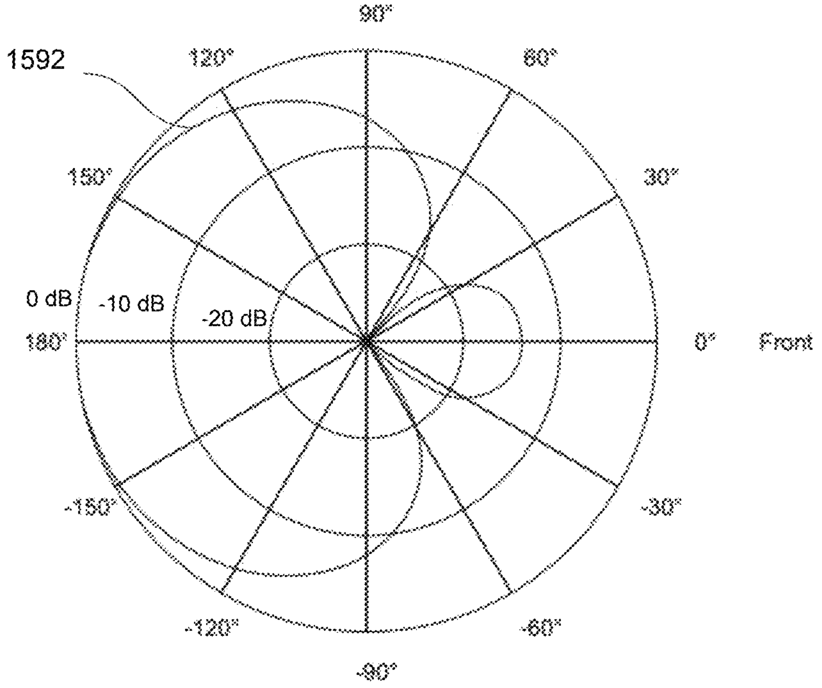
FIG. 15 illustrates a back-facing hypercardioid pattern, in accordance with certain embodiments described herein.
Figure 16:
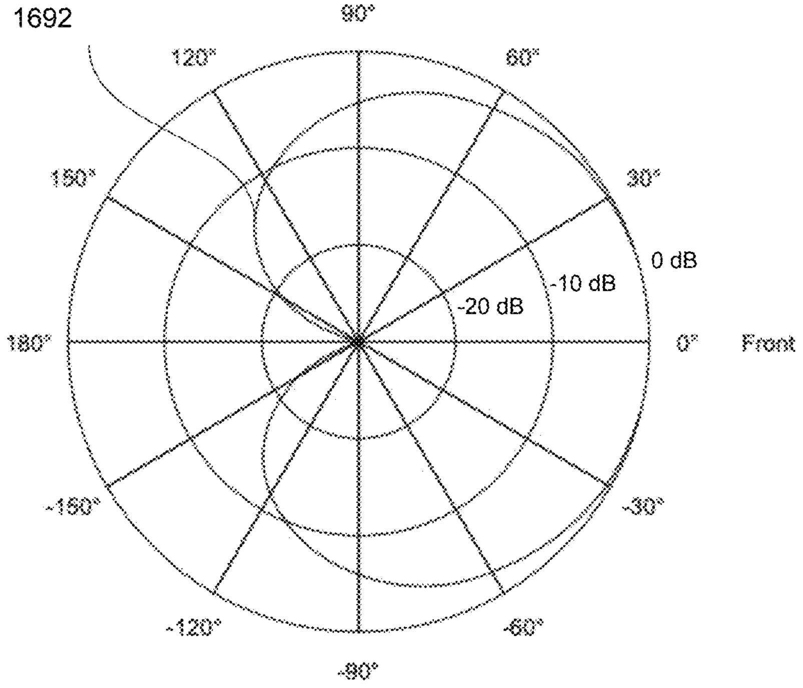
FIG. 16 illustrates a front-facing cardioid pattern, in accordance with certain embodiments described herein.
Figure 17:
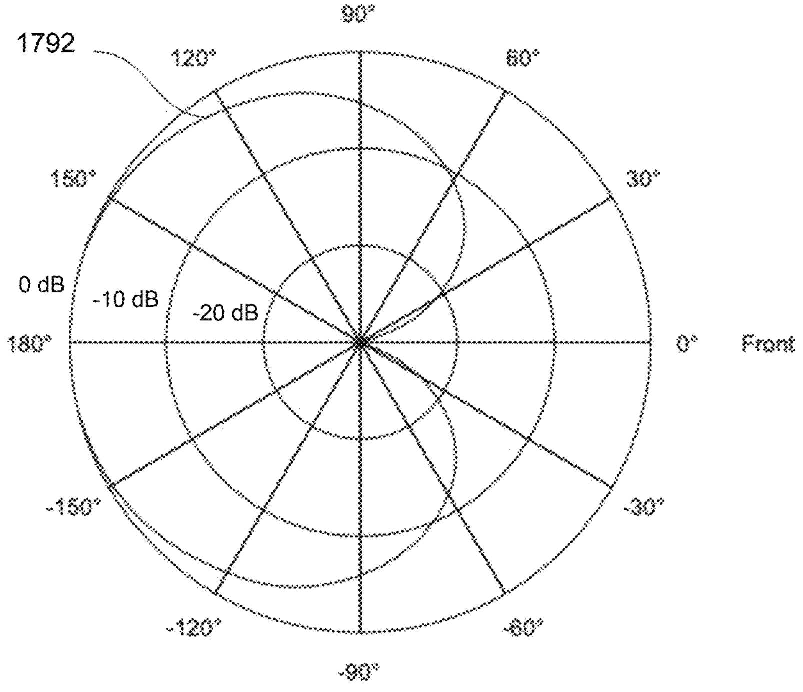
FIG. 17 illustrates a back-facing cardioid pattern, in accordance with certain embodiments described herein.
Figure 18:
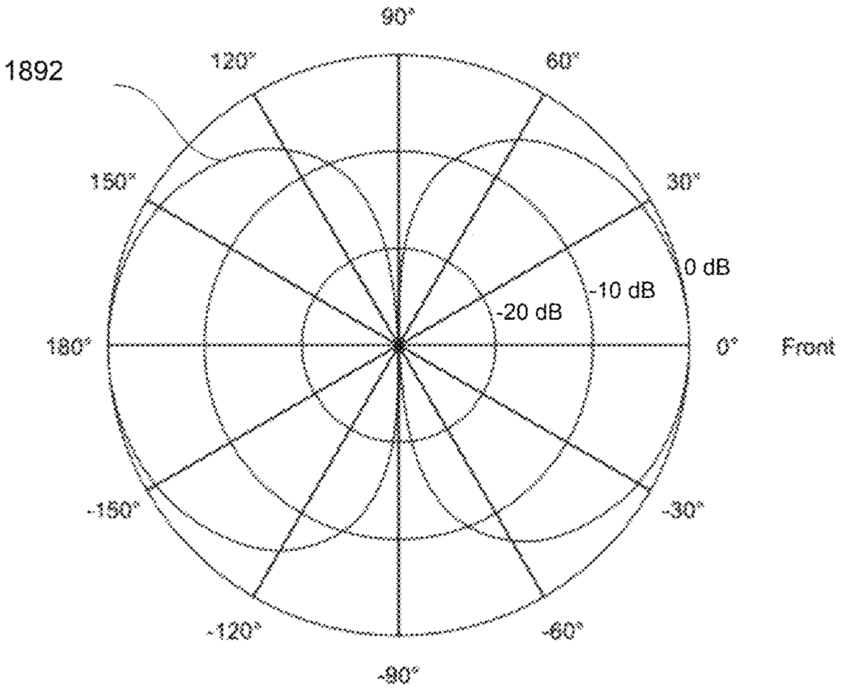
FIG. 18 illustrates a dipole pattern, in accordance with certain embodiments described herein.

FIG. 12 illustrates a front-facing hypercardioid pattern 1292, in accordance with certain embodiments described herein. A front-facing hypercardioid pattern may result from applying a delay of d/3c to the signal from the back microphone, where d is the spacing between the front microphone and the back microphone and c is the speed of sound. FIG. 13 illustrates a back-facing hypercardioid pattern 1392, in accordance with certain embodiments described herein. A back-facing hypercardioid pattern may result from applying a delay of d/3c to the signal from the front microphone. FIG. 14 illustrates a front-facing supercardioid pattern 1492, in accordance with certain embodiments described herein. A front-facing supercardioid pattern may result from applying a delay of 2d/3c to the signal from the back microphone. FIG. 15 illustrates a back-facing hypercardioid pattern 1592, in accordance with certain embodiments described herein. A back-facing supercardioid pattern may result from applying a delay of 2d/3c to the signal from the front microphone. FIG. 16 illustrates a front-facing cardioid pattern 1692, in accordance with certain embodiments described herein. A front-facing cardioid pattern may result from applying a delay of d/c to the signal from the back microphone. FIG. 17 illustrates a back-facing cardioid pattern 1792, in accordance with certain embodiments described herein. A back-facing cardioid pattern may result from applying a delay of d/c to the signal from the front microphone. FIG. 18 illustrates a dipole pattern 1892, in accordance with certain embodiments described herein. A dipole pattern may result from applying no delay to either microphone.

As described above, the neural network circuitry 424 may be configured to receive as inputs (in some embodiments, in addition to other signals) one or more signals originating from beamformed signals. In some embodiments, these beamformed signals may be frequency-domain signals (e.g., the frequency-domain beamformed signals 422) although time-domain beamformed signals may also be used as described above. In some embodiments, the one or more beamformed signals may include a signal having a dipole pattern. In some embodiments, the one or more beamformed signals may include a signal having a front-facing supercardioid pattern. In some embodiments, the one or more beamformed signals may include a signal having a back-facing supercardioid pattern. In some embodiments, the one or more beamformed signals may include a signal having a front-facing cardioid pattern. In some embodiments, the one or more beamformed signals may include a signal having a back-facing cardioid pattern. In some embodiments, the one or more beamformed signals may include a signal having a front-facing supercardioid pattern and a signal having a back-facing supercardioid pattern. In some embodiments, the one or more beamformed signals may include a signal having a front-facing cardioid pattern and a signal having a back-facing cardioid pattern. In some embodiments, the one or more beamformed signals may include a signal having a front-facing supercardioid pattern, a signal having a back-facing supercardioid pattern, and a signal having a dipole pattern. In some embodiments, the one or more beamformed signals may include a signal having a front-facing cardioid pattern, a signal having a back-facing cardioid pattern, and a signal having a dipole pattern. In some embodiments, the one or more beamformed signals may include one signal. In some embodiments, the one or more beamformed signals may include two signals. In some embodiments, the one or more beamformed signals may include three signals. In some embodiments, the one or more beamformed signals may include more than three signals.

Figure 19:
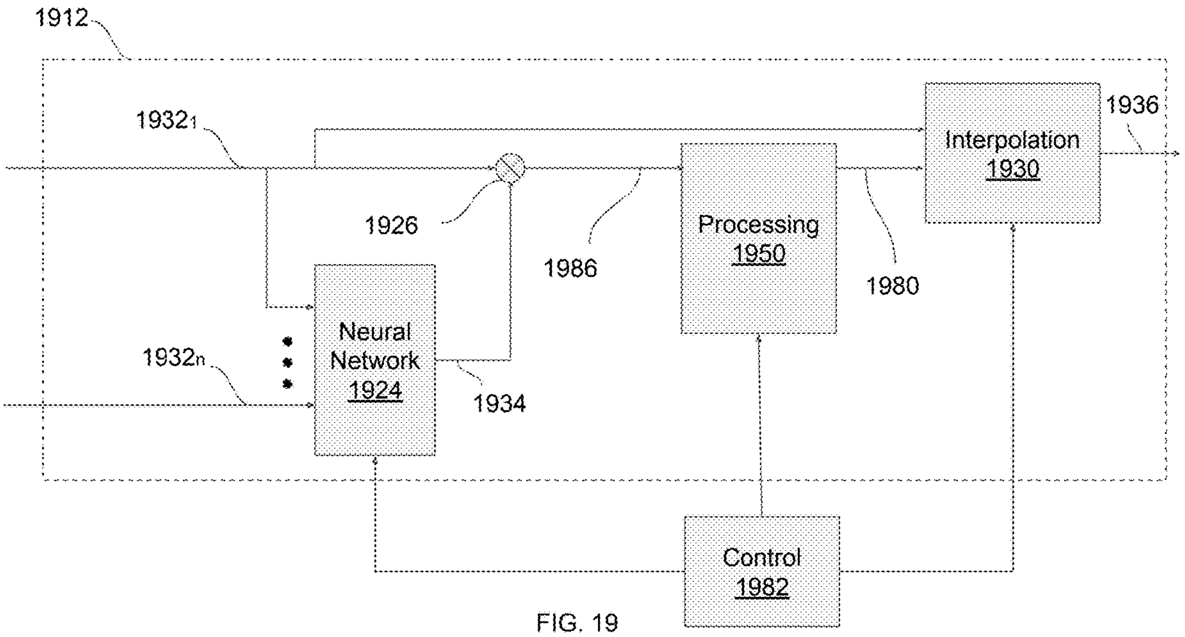
FIG. 19 illustrates enhancement circuitry, in accordance with certain embodiments described herein.

FIG. 19 illustrates enhancement circuitry 1912, in accordance with certain embodiments described herein. The enhancement circuitry 1912 may be the same as the enhancement circuitry 412. The enhancement circuitry 1912 includes the neural network circuitry 424. The neural network circuitry 424 may be configured to implement a neural network. In some embodiments, the neural network may be a recurrent neural network. In some embodiments, the neural network circuitry 424 may be configured to implement a single neural network. Thus, in some embodiments, the neural network circuitry 424 may be configured to implement a single recurrent neural network. It should be understood that any of the neural networks described herein may be recurrent neural networks, or another type of neural network, such as a vanilla/feedforward neural network, a convolutional neural network, a generative adversarial network, an attention network (e.g. transformer), or a graphical neural network. Additionally, in some embodiments, multiple neural networks may be used.

In some embodiments, the neural network may be trained to reduce noise (i.e., reduce non-speech). In some embodiments, the neural network may be trained to perform spatial focusing. In some embodiments, the neural network may be trained to both reduce noise and perform spatial focusing. In particular, the neural network circuitry 424 may be configured to receive multiple input audio signals 1932$_1$ . . . 1932$_n$. In some embodiments, the input audio signals 1932$_1$ . . . 1932$_n$ may be frequency-domain audio signals. In some embodiments, the input audio signals 1932$_1$ . . . 1932$_n$ may be time-domain audio signals. In embodiments in which the input audio signals 1932$_1$ . . . 1932$_n$ to the neural network circuitry 424 are frequency-domain audio signals, in some embodiments, the input audio signals 1932$_1$ . . . 1932$_n$ may originate from either or both of the one or more frequency-domain non-beamformed audio signals 420 (which may be, for example, either or both of the front frequency-domain audio signal 420*f* and the back frequency-domain audio signal 420*b*) and the one or more frequency-domain beamformed audio signals 422 (which may be, for example, audio signals having dipole, cardioid, supercardioid, or hypercardioid beam patterns, and may be generated, for example, based on the front frequency-domain audio signal 420*f* and the back frequency-domain audio signal 420*b*, or generally, based on the one or more frequency-domain non-beamformed audio signals 420).

Based on the input audio signals 1932$_1$ . . . 1932$_n$, the neural network circuitry 424 may be configured to output a single output mask 1934. The mask 1934 may be configured to generate an output 1986. In the example of FIG. 19, the mask 1934 may be used to mask one of input audio signals 1932$_1$ . . . 1932$_n$ (referenced as the input audio signal 1932$_1$ in this description) to generate the output 1986. In particular, in the example of FIG. 19, the multiplier 1926 may be configured to multiply the input audio signal 1932$_1$ by the mask 1934 to generate the output 1986. (In other embodiments, a mask may operate on an input audio signal in other ways, such as by addition.) In some embodiments, the input audio signal 1932$_1$ that is multiplied by the mask 1934 may be one of the frequency-domain beamformed audio signals 422 (or a processed version thereof). For example, the input audio signal 1932$_1$ may be a frequency-domain audio signal having a front-facing cardioid pattern or a frequency-domain audio signal having a front-facing supercardioid pattern. In some embodiments, the input audio signal 11932$_1$9321 that is multiplied by the mask 1934 may be the front frequency-domain audio signal 420*f* (or a processed version thereof). In some embodiments, the mask 1934 may be multiplied by other signals.

The mask 1934 may be a real or complex mask that varies with frequency. Thus, when the mask 1934 is multiplied by the input audio signal 1932$_1$, it may operate differently on different frequency components of the input audio signal 1932$_1$. In other words, the mask 1934 may cause different frequency components of the input audio signal 1932$_1$ to be multiplied by different real or complex values. A real mask may modify just magnitude, while a complex mask may modify both magnitude and phase.

Figure 20:
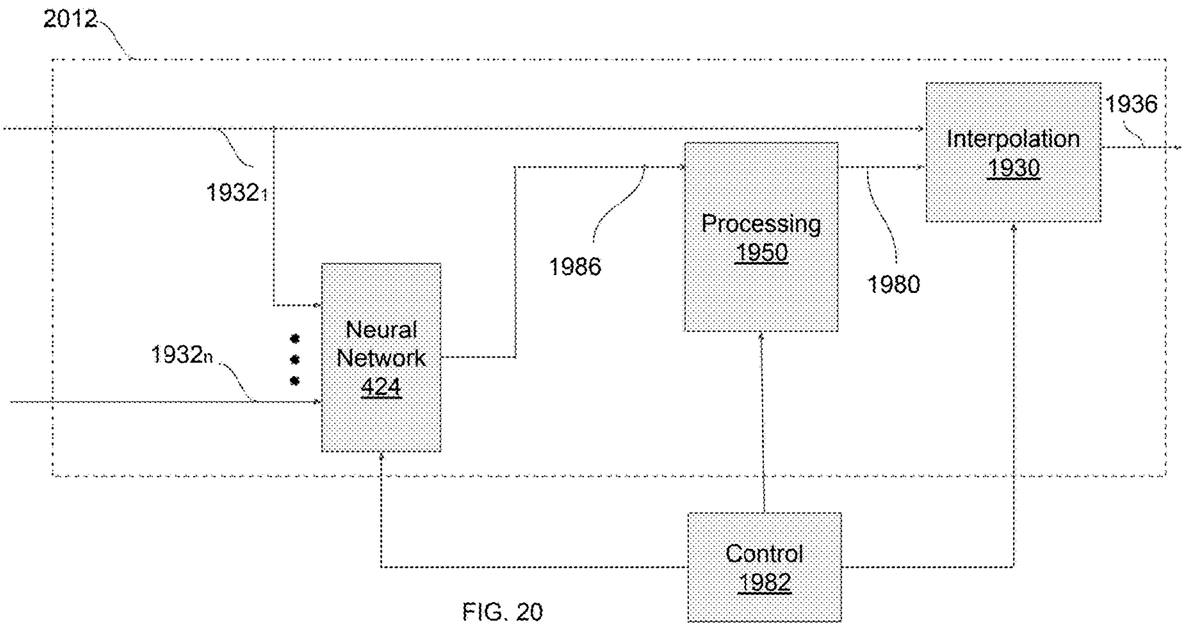
FIG. 20 illustrates enhancement circuitry, in accordance with certain embodiments described herein.

Turning to FIG. 20, FIG. 20 illustrates enhancement circuitry 2012, in accordance with certain embodiments described herein. The enhancement circuitry 2012 may be the same as the enhancement circuitry 412. The enhancement circuitry 2012 includes the neural network circuitry 424. The neural network circuitry 424 may be configured to implement a neural network (e.g., a recurrent neural network). The enhancement circuitry 2012 is the same as the enhancement circuitry 1912, except that the neural network implemented by the neural network circuitry 424 is trained to generate the output 1986 itself, rather than a mask. Because in the enhancement circuitry 2012, a mask does not need to be applied, the multiplier 1926 is absent. It should thus be appreciated that the neural network implemented by the neural network circuitry 424 may be configured to generate the output 1986 directly (as in FIG. 20) or to generate a mask 1934 for generating the output 1986 (as in FIG. 19).

The processing circuitry 1950 of FIGS. 19 and 20 may be configured to perform further processing on the output 1986 to generate an output 1980, which may be an output audio signal. In some embodiments, the processing circuitry 1950 may be absent, and the output 1986 (which may be an output audio signal) of the multiplier 1926 may be fed directly to the interpolation circuitry 1930.

Generally, the interpolation circuitry 1930 of FIGS. 19 and 20 may be configured to interpolate between one of the input audio signals $\mathbf{1932}_1$ . . . $\mathbf{1932}_n$ and an output audio signal from the neural network, or a processed version thereof. In the example of FIG. 19, the interpolation circuitry 1930 may be configured to interpolate between 1. The output 1980, namely an audio signal that results from processing the output 1986 with the processing circuitry 1950 (or, when the processing circuitry is absent, just the output 1986) and 2. The input audio signal $\mathbf{1932}_1$ itself, with each of the components being weighted by a certain amount. For example, referring to the output 1980 as A and referring to the input audio signal $\mathbf{1932}_1$ itself as B, the output of the interpolation circuitry 1930 may be $x*A+(1-x)*B$, where x may be a value between 0 and 1. In some embodiments, the output 1936 of the interpolation circuitry 1930 may be the same as the output signal 450. The interpolation circuitry 1930 may provide control over how much the output of the neural network contributes to the final output versus how much the conventionally beamformed output contributes to the final output. In some embodiments, the amount x in the above expression, which controls the weightings in the interpolation, may be predetermined. In some embodiments, this amount x may be set by the wearer of the hearing aid, for example by making a selection on a processing device (e.g., a phone or tablet) in operative communication with the hearing aid. In some embodiments, the interpolation circuitry 1930 may be absent, and the output of the enhancement circuitry 1912 may be just the output 1980 (or when the processing circuitry 1950 is absent, the output 1986).

The control circuitry 1982 of FIGS. 19 and 20 may be configured to control operation of various portions of the enhancement circuitry 1912, such as the neural network circuitry 424, the processing circuitry 1950, and/or the interpolation circuitry 1930.

As described above, the output of the neural network circuitry 424 may be the output 1986, or a mask 1934 that generates the output 1986. In some embodiments, the output 1986 may be an output audio signal. In some embodiments, the output 1986 may be a different kind of output, such as a sound map, or values calculated for a metric from audio from multiple beams (each of the multiple beams pointing at a different angle around a wearer of the ear-worn device), both of which are described below. When the output 1986 is not an audio signal, in some embodiments, the output 1980 may be an audio signal. Thus, the processing circuitry 1950 may convert the output 1986 into an audio signal. When the output 1986 is an output audio signal, the output 1986 may be a noise-reduced and/or spatially-focused output signal. When the output 1986 is processed into an output audio signal (e.g., the output 1980), the output audio signal may be a noise-reduced and/or spatially-focused output signal. Because the neural network may be trained to generate a noise-reduced and/or spatially-focused output signal, or an output used for generating a noise-reduced and/or spatially-focused output signal, the neural network may be considered trained to perform noise reduction and/or spatial focusing.

Neural networks will now be described in further detail. When the neural network implemented by the neural network circuitry 424 is trained to perform noise reduction, in some embodiments the output audio signal (e.g., the output 1986) may be a noise-reduced output audio signal. In the example of FIG. 19, the mask 1934 generated by the neural network may be applied to the input audio signal $\mathbf{1932}_1$ thereby generating a noise-reduced output audio signal (e.g., the output 1986) from the input audio signal $\mathbf{1932}_1$. In the example of FIG. 20, the output 1986 generated by the neural network may be a noise-reduced output audio signal. Training such a neural network may include obtaining noisy speech audio streams and noise-reduced versions of the audio streams. For a neural network trained to output a mask, masks that, when applied to the noise speech audio streams, result in the noise-reduced audio streams, may be determined. The training input data may be the noisy speech audio streams and the training output data may be the masks. The neural network may thereby learn how to output a noise-reducing mask for given input audio streams. For a neural network trained to output an audio signal, the training input data may be the noisy speech audio streams and the training output data may be the denoised audio streams. The neural network may thereby learn how to output a noise-reduced output audio stream for given input audio streams. Further description of neural networks trained to perform noise reduction may be found in U.S. Patent App. Pub. No. US20230232169A1, titled "Method, Apparatus and System for Neural Network Hearing Aid," published on Jul. 20, 2023 and based on an application filed on Jan. 14, 2022. Because the neural networks described herein may accept multiple input signals, each set of training input data may include multiple input signals. As will be described below, neural networks may be trained on collected data, synthetic data, or both collected data and synthetic data.

When the neural network implemented by the neural network circuitry 424 is trained to perform spatial focusing, in some embodiments the output audio signal (e.g., the output 1986) may be a spatially-focused output audio signal. In the example of FIG. 19, the mask 1934 generated by the neural network may be applied to the input audio signal $\mathbf{1932}_1$ thereby generating a spatially-focused output audio signal (e.g., the output 1986) from the input audio signal $\mathbf{1932}_1$. In the example of FIG. 20, the output 1986 generated by the neural network may be a spatially-focused output audio signal. When the neural network implemented by the neural network circuitry 424 is trained to perform noise reduction and spatial focusing, in some embodiments the output audio signal (e.g., the output 1986) may be a noise-reduced and spatially-focused output audio signal. In the example of FIG. 19, the mask 1934 generated by the neural network may be applied to the input audio signal $\mathbf{1932}_1$ thereby generating a noise-reduced and spatially-focused output audio signal (e.g., the output 1986) from the input audio signal $\mathbf{1932}_1$. In the example of FIG. 20, the output 1986 generated by the neural network may be a noise-reduced and spatially-focused output audio signal.

In some embodiments, a spatially-focused output audio signal (which may also be a noise-reduced output audio signal) may use a mapping of gains to respective spatial regions (in other words, particular DOAs). In some embodiments, gain may be equal to or between 0 and 1. In some embodiments, gain may be equal to or greater than 0. Mapping gains to spatial regions may result in focusing, as higher gains may be applied to sounds originating from certain spatial regions and lower gains may be applied to sounds originating from other spatial regions. The spatial regions may be defined relative to the wearer of the ear-worn device. In some embodiments, the mapping may include applying a gain of 1 (or approximately 1) to audio generated from sounds coming from a target spatial region (which need not necessarily be continuous) and applying a gain of 0 (or approximately 0) to audio generated from sounds coming from other spatial regions. Thus, a spatially-focused output audio signal may include sounds coming from spatial regions mapped to a gain of 1 and exclude sounds coming from spatial regions mapped to a gain of 0.

Figure 21:
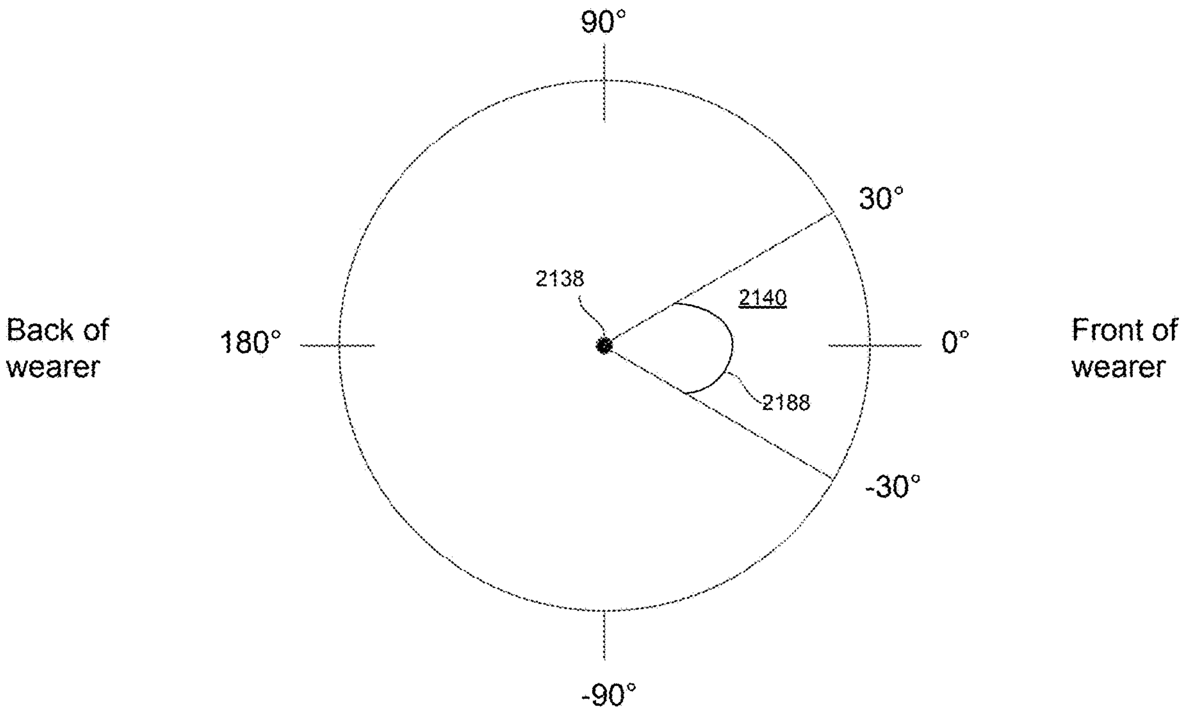
FIG. 21 illustrates an example of mapping gain to spatial regions, in accordance with certain embodiments described herein.

FIG. 21 illustrates an example of mapping gain to spatial regions, in accordance with certain embodiments described herein. In FIG. 21, a target spatial region 2140 having an angle 2188 of 60 degrees relative to the wearer 2138 (in particular, in front of the wearer 2138) is defined. Sounds within the target spatial region 2140 (in other words, having DOAs between 30 and −30 degrees) may be defined as target (i.e., gain=1) while sounds outside the target spatial region 2140 may be defined as interfering (i.e., gain=0). In other words, there may be two spatial regions; sounds inside the target spatial region 2140 may be processed with a gain of 1 and sounds outside the target spatial region 2140 may be processed with a gain of 0.

It should be appreciated that target spatial regions having angles relative to the wearer other than 60 degrees may also be used. In some embodiments, the target spatial region may have an angle approximately equal to or between 10-180 degrees. In some embodiments, the target spatial region may have an angle approximately equal to or between 20-180 degrees. In some embodiments, the target spatial region may have an angle approximately equal to or between 30-180 degrees. In some embodiments, the target spatial region may have an angle approximately equal to or between 40-180 degrees. In some embodiments, the target spatial region may have an angle approximately equal to or between 50-180 degrees. In some embodiments, the target spatial region may have an angle approximately equal to or between 60-180 degrees. In some embodiments, the target spatial region may have an angle approximately equal to or between 10-150 degrees. In some embodiments, the target spatial region may have an angle approximately equal to or between 20-150 degrees. In some embodiments, the target spatial region may have an angle approximately equal to or between 30-150 degrees. In some embodiments, the target spatial region may have an angle approximately equal to or between 40-150 degrees. In some embodiments, the target spatial region may have an angle approximately equal to or between 50-150 degrees. In some embodiments, the target spatial region may have an angle approximately equal to or between 60-150 degrees. In some embodiments, the target spatial region may have an angle approximately equal to or between 10-120 degrees. In some embodiments, the target spatial region may have an angle approximately equal to or between 20-120 degrees. In some embodiments, the target spatial region may have an angle approximately equal to or between 30-120 degrees. In some embodiments, the target spatial region may have an angle approximately equal to or between 40-120 degrees. In some embodiments, the target spatial region may have an angle approximately equal to or between 50-120 degrees. In some embodiments, the target spatial region may have an angle approximately equal to or between 60-120 degrees. In some embodiments, the target spatial region may have an angle approximately equal to or between 10-90 degrees. In some embodiments, the target spatial region may have an angle approximately equal to or between 20-90 degrees. In some embodiments, the target spatial region may have an angle approximately equal to or between 30-90 degrees. In some embodiments, the target spatial region may have an angle approximately equal to or between 40-90 degrees. In some embodiments, the target spatial region may have an angle approximately equal to or between 50-90 degrees. In some embodiments, the target spatial region may have an angle approximately equal to or between 60-90 degrees. For example, the angle may be equal to or approximately equal to 10, 20, 30, 40, 50, 60, 70, 80, 90, 100, 110, 120, 130, 140, 150, 160, 170, or 180 degrees. It should be appreciated that the ear-worn device may be considered to focus on sounds originating from within the target spatial region 2140.

For training, in some embodiments, a training input audio signal may be formed from component audio signals, some originating from within a target spatial region (e.g., the target spatial region 2140) and some originating from outside the target spatial region. Components of a training input audio signal may be labeled as target (gain=1) or distractor (gain=0) depending on whether they originate from within or outside the target spatial region. Signals from multiple microphones may be generated from the training input audio signal. For a neural trained to output a mask, a training mask may be determined such that, when the training mask is applied to one of the microphone signals or a beamformed version of the microphone signals, just components originating from within the target spatial region (i.e., those input signals labeled as target) remain. It should be appreciated that components of training input signals may be labeled as target (include) or distractor (null out) depending on whether they originate from within or outside the target spatial region, rather than explicitly labeling them with their DOA. The neural network may thereby be trained to take input signals during inference and predict a mask that, when used to mask an input audio signal, results in just components of the input audio signal that originated within the target spatial region remaining. For a neural trained to output an audio signal, the training output may be an audio signal having components just originating from within the target spatial region. The neural network may thereby be trained to take input signals during inference and predict an output audio signal (e.g., the output 1986) having just components of an input audio signal that originated within the target spatial region remaining.

In any of the training described herein, two methods for generating multi-microphone localized training data may include 1. Collecting audio originating from sounds at different DOAs with multiple microphones, and 2. Synthetically creating multiple microphone signals as though a sound source was localized at a specific DOA using audio simulation. Synthetic generation of training signals may include adding directionality to different sound sources (speech signals and noise) in simulation and then adding these together to create a new signal with spatial audio. A neural network may be trained on either or both of synthetic data and captured data.

Figure 22:
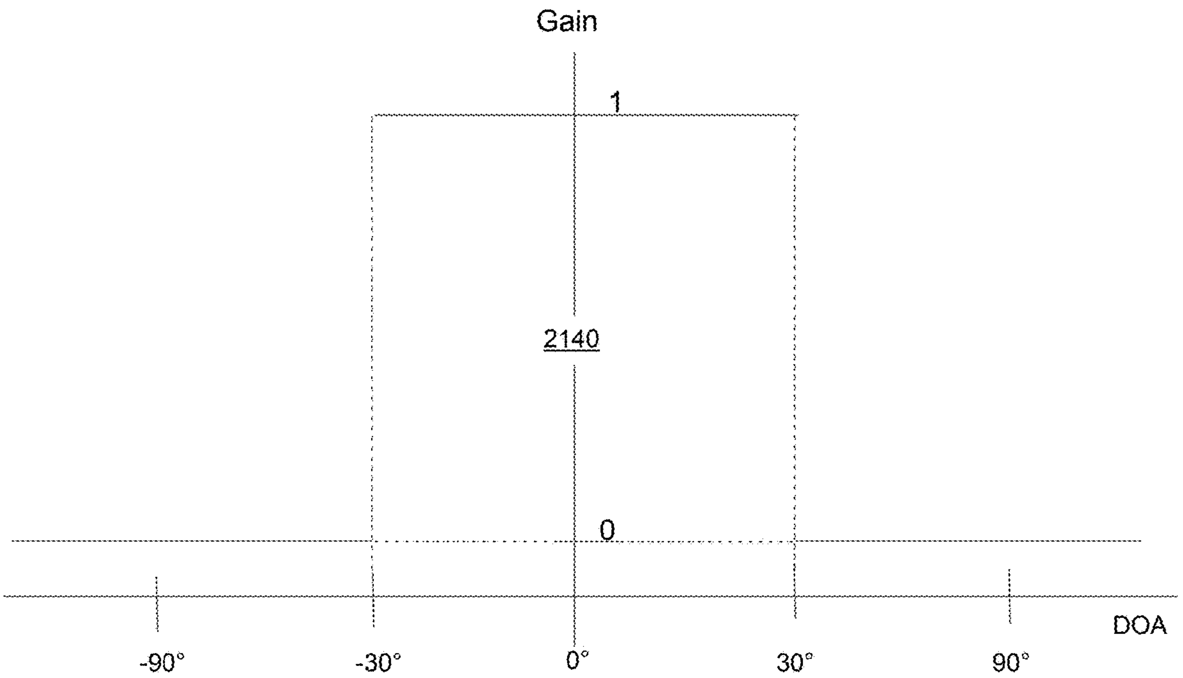
FIG. 22 illustrates an alternative view of the mapping from FIG. 21, in accordance with certain embodiments described herein.

FIG. 22 illustrates an alternative view of the mapping from FIG. 21, in accordance with certain embodiments described herein. As illustrated, there is a sharp transition spatially from DOAs within the spatial region using a gain 1 (i.e., the target spatial region 2140) to DOAs within the spatial region using a gain 0 (i.e., the spatial region outside the target spatial region 2140). Thus, even a small movement of the wearer's head may cause a sound source to transition from being within the spatial region using a gain of 1 to being within the spatial region using a gain of 0, leading to a sharp nulling out of the sound.

Figure 23:
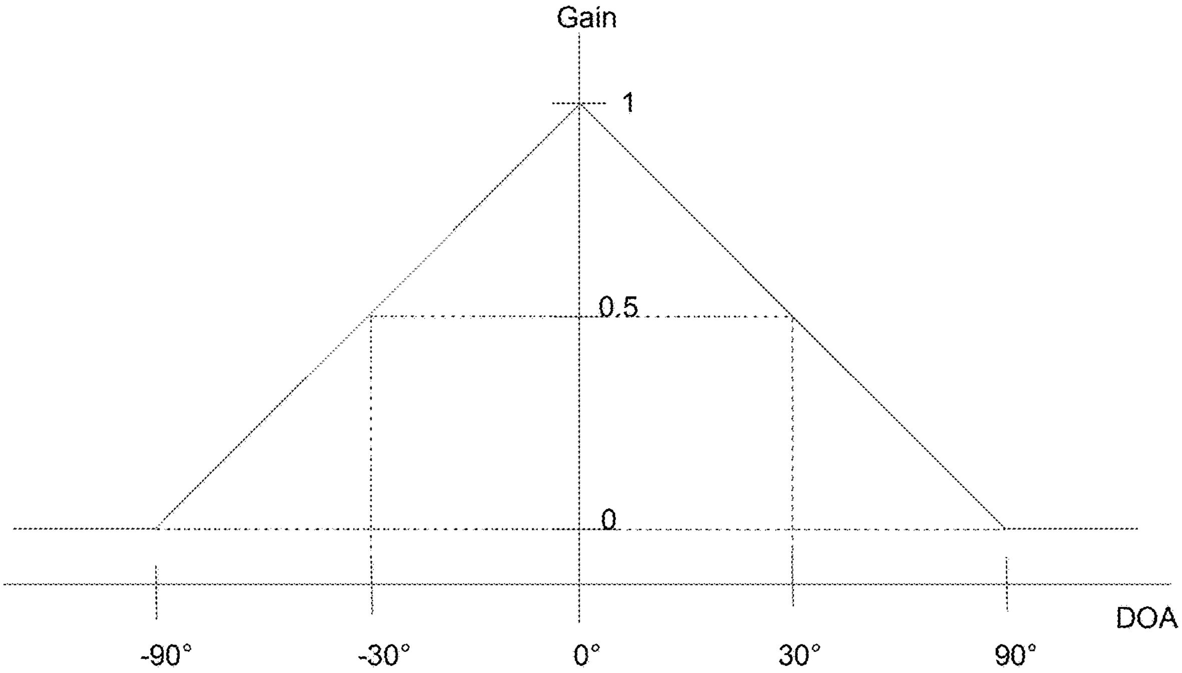
FIG. 23 illustrates an example of mapping gain to direction-of-arrival, in accordance with certain embodiments described herein.

In some embodiments, gain may smoothly transition, or transition approximately smoothly, as a function of DOA. FIG. 23 illustrates an example of mapping gain to DOA, in accordance with certain embodiments described herein. As illustrated, the gain transitions smoothly or approximately smoothly from a gain of 1 at a DOA of 0 degrees (i.e., directly in front of the wearer), to a gain of 0.5 at a DOA of 30 degrees and −30 degrees, and to a gain of 0 at DOAs of 90 degrees and −90 degrees and beyond. Thus, the entire back of the wearer may be nulled out. A function such as the one illustrated in FIG. 23 may be realized by inputting a given DOA into a formula. For example, the formula may be $gain=(-1/90)*DOA+1$ when $0\leq DOA\leq 90$ degrees and $gain=(1/90)*DOA+1$ when $-90\leq DOA\leq 0$ degrees. In some embodiments, multiple DOA bins (which may also be considered spatial regions) may be defined and each associated with a gain. For example, each bin may encompass 1 degree, such as a bin for DOAs between 0 and 1 degrees, a bin for DOAs between 1-2 degrees, etc. For a given DOA, the gain associated with the bin encompassing that DOA may be determined (e.g., from a lookup table). Generally, there may be more than two groups of spatial regions each having a different gain, and/or one or more of the spatial regions may be processed with gains not equal to 1 or 0. The smoothness of the gain function may depend on the number of spatial regions with different gains. It should be appreciated that the ear-worn device may be considered to focus on sounds originating from certain spatial regions, for example those having a gain larger than a threshold (e.g., 0.5). The result of applying the mask 1934 to the input audio signal 19321 may be an audio signal (i.e., the output 1986) equivalent to each component of the input audio signal 19321 multiplied by a gain associated with the spatial region from which the component originated. In embodiments that include focusing on multiple DOAs, multiple different functions like the one in FIG. 23 may be generated, and the sum or the union of the functions may be used.

For training, in some embodiments, a training input audio signal may be formed from component audio signals originating from within different spatial regions. Each component of a training input audio signal may be labeled with a gain associated with the spatial region from which the component audio signal originated. Signals from multiple microphones may be generated from the training input audio signal. When the neural network is trained to output a mask, a training mask may be determined such that, when the training mask is applied to one of the microphone signals or a beamformed version of the microphone signals, what remains is each component audio signal multiplied by a gain (which may be 0, 1, or other values in between) corresponding to the spatial region from which it originated, and then summed together. The neural network may thereby be trained to take input audio signals during inference and predict a mask that, when used to mask an input audio signal, results in each component audio signal multiplied by a gain (which may be, for example, 0, 1, or other values in between) corresponding to the spatial region from which it originated, and then summed together. For a neural trained to output an audio signal, the training output may be an audio signal in which each component audio signal is multiplied by a gain corresponding to the spatial region from which it originated, and then summed together. The neural network may thereby be trained to take an input signal during inference and predict an output audio signal (e.g., the output 1986) in which each component audio signal is multiplied by a gain corresponding to the spatial region from which it originated, and then summed together.

In some embodiments, the mappings may be predetermined. In other words, the bounds of the various spatial regions and the gain associated with each spatial region may be determined at training time. The mappings of FIGS. 21-23 may be examples of predetermined mappings. In some embodiments, mappings may not be predetermined. In other words, the bounds of the various spatial regions and/or the gain associated with each spatial region may be determined after training time (e.g., at inference time). In some embodiments, the output 1986 may be a sound map indicating the frequency components of sound originating from each spatial region. In the example of FIG. 19, the mask 1934 generated by the neural network may be applied to the input audio signal $\mathbf{1932}_1$ thereby generating the sound map. In the example of FIG. 20, the output 1986 generated by the neural network may be the sound map. In more detail, if multiple frequency bins are defined, and multiple spatial regions are defined, the sound map may indicate a value for each frequency bin originating from each spatial region. For example, if the number of frequency bins is n and the number of spatial regions is m, then the sound map may be an n×m array. When a neural network is also trained to perform noise reduction, the sound map may be a speech map indicating the frequency components of speech originating from each spatial region. Each spatial region may be, for example, a certain range of degrees relative to the wearer. In embodiments in which there are two microphones with symmetry about the axis connecting the two microphones (e.g., the front microphone 102*f* and the back microphone 102*b* illustrated in FIG. 1), the ear-worn device may not be able to distinguish between sounds coming from the left of the wearer or from the right of the wearer. In such embodiments, one spatial region may be defined combining symmetrical regions on the left and right of the wearer. For example, one spatial region may be defined for both the region 20-25 degrees to the left of the wearer and the region 20-25 degree to the right of the wearer. In embodiments in which there are microphones without symmetry about the axis connecting the microphones, then the ear-worn device may be able to distinguish between sounds coming from the left of the wearer and sounds coming from the right of the wearer. In such embodiments, separate regions may be defined for symmetrical regions on the left and right of the wearer. Examples of ear-worn devices that lack symmetry about the axis connecting the microphones may be eyeglasses with built-in hearing aids (e.g., the eyeglasses 358 with the microphones 302). In embodiments in which there is binaural communication, then the ear-worn device or system of ear-worn devices may be able to distinguish between sounds coming from the left of the wearer and sounds coming from the right of the wearer. For example, a device on the left ear of the wearer may detect a sound coming from the left of the wearer before a device on the right ear of the wearer, and this earlier detection may be communicated between the two ears to determine that the sound came from the left of the wearer. Binaural communication may occur, for example, in a system of two hearing aids, cochlear implants, or earphones that communicate with each other over a wireless communication link. Binaural communication may also occur in an ear-worn device such as eyeglasses with built-in hearing aids, in which a device in a portion of the eyeglasses near one ear may communicate with a device in a portion of the eyeglasses near the other ear over a wired communication link within the eyeglasses.

In some embodiments, using the sound map, the enhancement circuitry 1912 may be configured to apply a beam pattern to the sound map using the processing circuitry 1950, and the beam pattern need not be predetermined. The result of applying the beam pattern may be a spatially-focused audio signal, and thus the sound map may be used for generating a spatially-focused audio signal. As will be described below, the beam pattern may be based on a selection from a wearer of the ear-worn device. To apply a beam pattern, the processing circuitry 1950 may be configured to apply different gains to sounds originating from the different spatial regions (as indicated by the sound map) and these gains need not be predetermined.

In some embodiments that include an ear-worn device with an array of more than two microphones (e.g., on eyeglasses such as the eyeglasses 358), beamforming circuitry (e.g., the beamforming circuitry 408) may be configured to generate, at each time step, multiple beams (e.g., between or equal to 10-20 beams) that each points at a different angle around the 360-degree circle relative to the wearer. The output 1986 may be values calculated for a metric from audio from the multiple beams. In particular, the neural network circuitry 424 may implement a neural network trained to calculate an individual value for the metric for the audio from each individual beam. Thus, each beam may have a different value for the metric. As examples, the metric may be SNR or speaker power. The enhancement circuitry 1912 or 2012, or in particular, the processing circuitry 1950, may be configured to combine the audio from the multiple beams using the values for the metric. For example, when the metric is SNR, the neural network may be configured to provide per-frame SNR (i.e., the output 1986) of inputted audio signals. Then the processing circuitry 1950 may be configured to output the sum of the audio from each beam weighted by each beam's SNR as calculated by the neural network. In particular, low-SNR beams may be down-weighted and high-SNR beams may be up-weighted. Thus, focus may be placed on those beams having the highest SNR audio. The result may therefore be a spatially-focused audio signal, and thus the values calculated for the metric may be used for generating a spatially-focused audio signal. In some embodiments, before summing the beams, the processing circuitry may be configured to apply a moving average across the audio from the different beams.

In some embodiments, spatial focusing may be based on wearer selection. The wearer may be able to control spatial focusing using a processing device (e.g., a smartphone or tablet) in operative communication with the ear-worn device. In some embodiments, the processing device may be configured to receive a selection from the wearer of whether to perform spatial focusing or not. If turned on, spatial focusing by the neural network as described above may be used. If turned off, spatial focusing may not be performed by the neural network. The processing device may transmit to the processing device an indication of the wearer selection of whether to turn focusing on or off, and control circuitry 1982 may be configured to use this indication to control whether focusing is enabled or disabled. For example, the control circuitry 1982 may use this indication to modify the interpolation coefficient used by the interpolation circuitry 1930 to 0 (focusing turned off) or a value greater than 0 (focusing turned on). As another example, the control circuitry 1982 may use this indication to modify a parameter of the neural network to perform spatial focusing or not.

Figure 24:
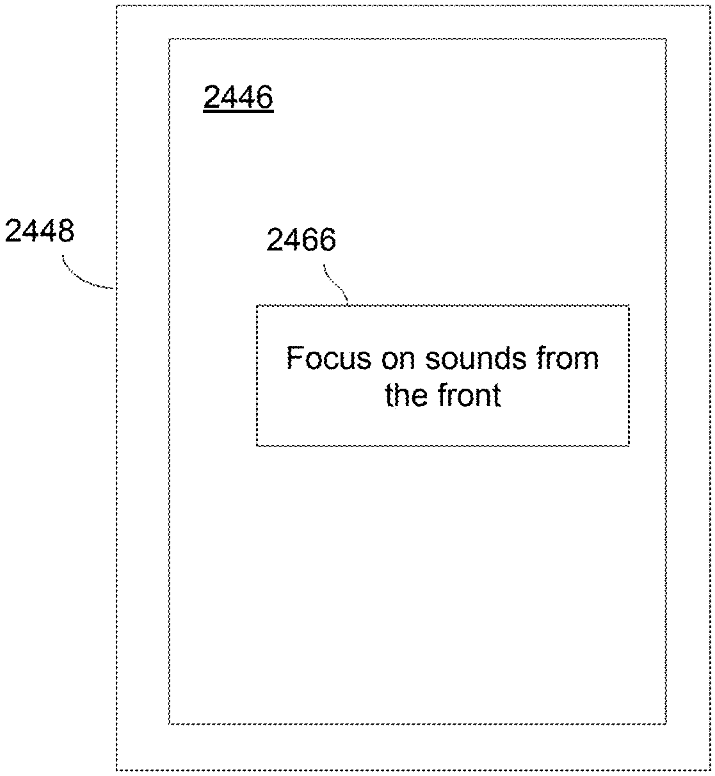
FIG. 24 illustrates a graphical user interface (GUI) for controlling spatial focusing of an ear-worn device, in accordance with certain embodiments described herein.

FIG. 24 illustrates a graphical user interface (GUI) 2446 for controlling spatial focusing of an ear-worn device, in accordance with certain embodiments described herein. The GUI 2446 is displayed on a processing device 2448 (e.g., a smartphone or tablet) in operative communication with an ear-worn device. The GUI 2446 includes an option 2466 which may be toggled by the user to turn focusing on or off. As described above, the processing device 2448 may transmit an indication of whether the wearer toggled the option 2466 on or off to the ear-worn device.

In some embodiments, the processing device may be configured to receive a selection from the wearer of how much focusing to perform. For example, the output of the enhancement circuitry may be a weighted combination of focused and non-focused audio, with the weighting determined by the wearer selection. The processing device 2448 may transmit an indication of the wearer selection of a degree of focusing (e.g., a value between or equal to 0 and 1) to the ear-worn device, and the control circuitry 1982 may be configured to use this indication to control how much focusing is enabled or disabled. For example, the control circuitry 1982 may use this indication to modify the interpolation coefficient used by the interpolation circuitry 1930 (e.g., to the value between or equal to 0 and 1). As another example, the control circuitry 1982 may use this indication to modify a parameter of the neural network controlling how much spatial focusing the neural network should perform.

Figure 25:
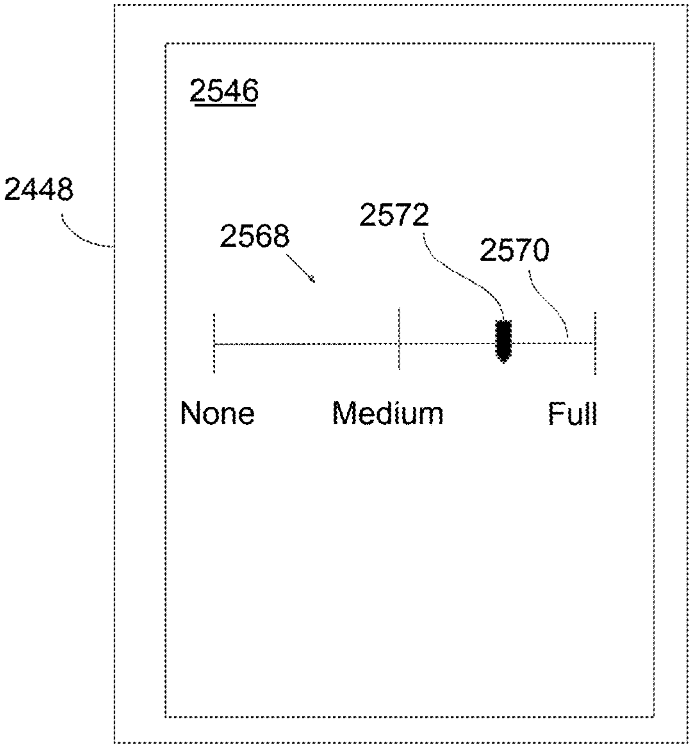
FIG. 25 illustrates a GUI for controlling spatial focusing of an ear-worn device, in accordance with certain embodiments described herein.

FIG. 25 illustrates a graphical user interface (GUI) 2546 for controlling spatial focusing of an ear-worn device, in accordance with certain embodiments described herein. The GUI 2546 is displayed on the processing device 2448 (e.g., a smartphone or tablet). The GUI 2546 includes a slider option 2568 which the user may use to control the degree of focusing. The slider option 2568 includes a line 2570 and a slider 2572. The wearer may control the position of the slider 2572 on the line 2570. The ratio of 1. The distance from the left end of the line 2570 to the position of the slider 2572, and 2. The length of the line 2570, may be a value between 0 and 1. The processing device 2448 may transmit an indication of this value to the ear-worn device (e.g., for use as the interpolation coefficient).

In embodiments in which the enhancement circuitry 1912 performs spatial focusing by applying a beam pattern to a sound map, in some embodiments, the beam pattern applied using the sound map may be based on wearer selection. In some embodiments, the selection from the wearer may be a selection of which spatial regions to include and which spatial regions to exclude. The wearer may make the selection using a processing device (e.g., a smartphone or tablet) in operative communication with the ear-worn device. The processing device 2448 may transmit to the ear-worn device an indication of the wearer selection of which spatial regions to focus on, and the control circuitry 1982 may use this indication to control the spatial regions used (e.g., by controlling operation of the processing circuitry 1950).

Figure 26:
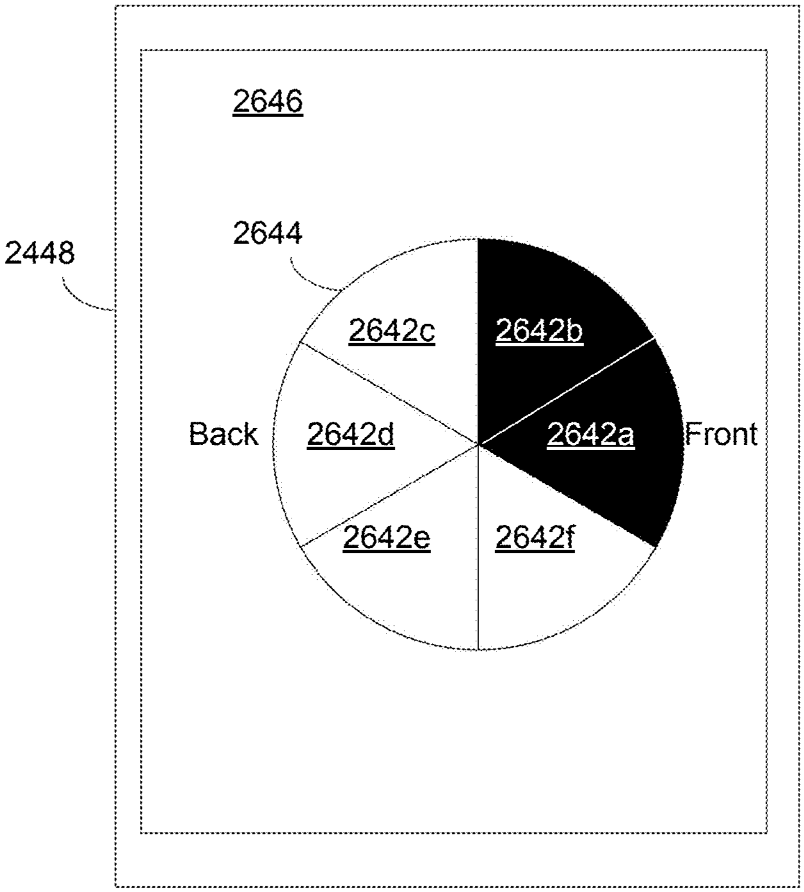
FIG. 26 illustrates a GUI for controlling spatial focusing of an ear-worn device, in accordance with certain embodiments described herein.

FIG. 26 illustrates a graphical user interface (GUI) 2646 for controlling spatial focusing of an ear-worn device (e.g., a hearing aid), in accordance with certain embodiments described herein. The GUI 2646 is displayed on the processing device 2448 (e.g., a smartphone or tablet). The GUI 2646 includes a circle 2644 representing the environment of the wearer, with the wearer considered to be in the center of the circle 2644, and the front of the wearer represented on the right side of the circle 2644 and the back of the wearer represented on the left side of the circle 2644. The circle 2644 includes multiple spatial regions 2642*a*-2642*f* that the wearer may select. In the example of FIG. 26, the wearer has selected the spatial regions 2642*a* and 2642*b*, causing them to be highlighted. The processing device 2448 may transmit commands to the ear-worn device to cause it to focus on sounds from the spatial regions 2642*a* and 2642*b*, and not focus on sounds from the spatial regions 2642*c*-2642*f*. In some embodiments, the processing circuitry 1950 may use the sound map described above to apply a beam pattern in accordance with the wearer's selections. For example, if the sound map indicates which sounds come from each of the spatial regions 2642*a*-2642*f*, then the processing circuitry 1950 may apply a gain of 1 to those sounds coming from the spatial regions 2642*a* and 2642*b* and apply a gain of 0 those sounds coming from the spatial regions 2642*c*-2642*f* as indicated by the sound map. As a particular example, consider that the sound map includes six columns, each corresponding to one of the spatial regions 2642*a*-2642*f*. Based on the wearer selection on the GUI 2646, the processing circuitry 1950 may retain values in the columns corresponding to the spatial regions 2642*a* and 2642*b* and null out values in the columns corresponding to the spatial regions 2642*c*-2642*f*. As another example, the processing circuitry 1950 may use a higher gain for values in the columns corresponding to the spatial regions 2642*a* and 2642*b* and use lower gains for values in the columns corresponding to the spatial regions 2642*c*-2642*f*, such that a smooth transition as illustrated in FIG. 23 may be realized. It should be appreciated that when using the GUI 2646, the wearer may be able to select one, two, or more than two of the spatial regions 2642*a*-2642*f*. It should also be appreciated that more or fewer than six spatial regions may be used in the GUI 2646.

In some embodiments, the selection from the wearer may be a selection of a size of a front-facing spatial region to use for focusing. For example, consider that the sound map includes 16 spatial regions. The enhancement circuitry 1912 may modify the size of the front-facing spatial region used for focusing by selecting the one front-facing spatial region of the 16 spatial regions, or selecting the two front-facing spatial regions of the 16 spatial regions, or selecting the 4 front-facing spatial regions of the 16 spatial regions, or selecting the 8 front-facing spatial regions of the 16 spatial regions. Thus, the wearer may be able to select a focusing width using a processing device (e.g., a smartphone or tablet) in operative communication with the ear-worn device. The processing device 2448 may transmit an indication of the wearer selection of focusing width to the ear-worn device, and the control circuitry 1982 may use this indication to control the spatial regions used (e.g., by controlling operation of the processing circuitry 1950).

Figure 27:
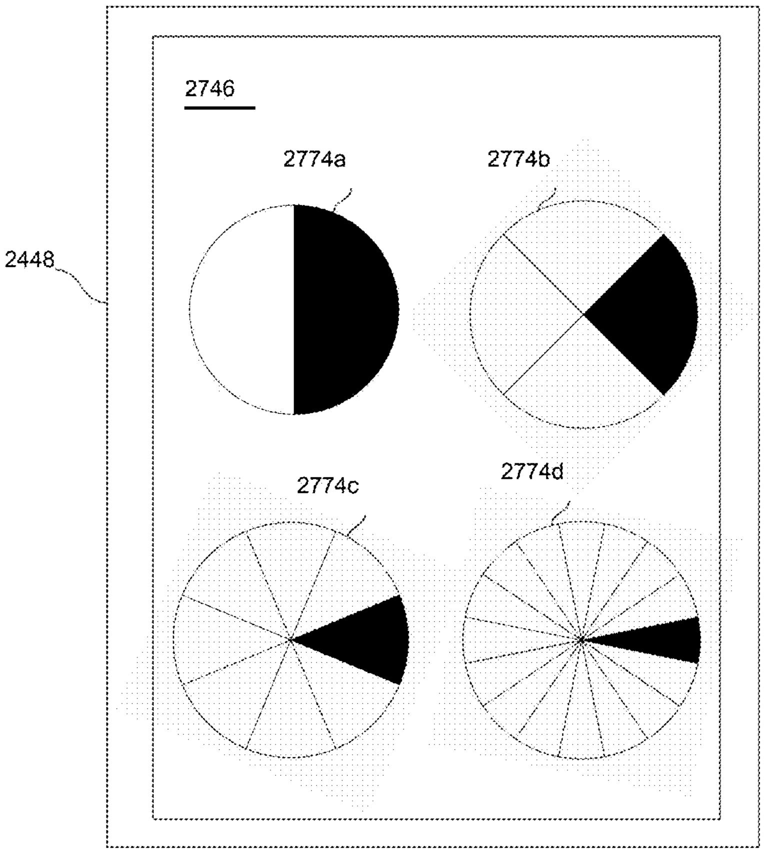
FIG. 27 illustrates a GUI for controlling spatial focusing of an ear-worn device, in accordance with certain embodiments described herein.

FIG. 27 illustrates a graphical user interface (GUI) 2746 for controlling spatial focusing of an ear-worn device (e.g., a hearing aid), in accordance with certain embodiments described herein. The GUI 2746 is displayed on the processing device 2448 (e.g., a smartphone or tablet). The GUI 2746 includes four options 2774*a*-2774*d*, each including a circle representing the environment of the wearer and one highlighted front-facing spatial region representing where the ear-worn device is focusing. The options 2774*a*-2774*d* include focused spatial regions of different sizes. Consider that the sound map used by the ear-worn device includes 16 spatial regions. The option 2774*a* may be realized by focusing on the front-facing 8 spatial regions of the 16 total spatial regions. The option 2774*b* may be realized by focusing on the front-facing 4 spatial regions of the 16 total spatial regions. The option 2774*c* may be realized by focusing on the front-facing 2 spatial regions of the 16 total spatial regions. The option 2774*d* may be realized by focusing on the front-facing spatial region of the 16 total spatial regions. The processing device 2448 may transmit an indication of the wearer's selection to the ear-worn device. In some embodiments, the processing circuitry 1950 may use the sound map described above to apply a beam pattern in accordance with the wearer's selections. For example, if the sound map indicates which sounds come from each of the 16 spatial regions, then the processing circuitry 1950 may include in its output those sounds coming from the focused spatial regions in the option 2774 selected by the wearer. Consider that the sound map includes 16 columns, each corresponding to one of 16 spatial regions. Based on the wearer selection on the GUI 2746, the processing circuitry 1950 may retain values in the columns corresponding to the focused spatial regions and null out values in the columns corresponding to the other spatial regions. As another example, the processing circuitry 1950 may use a higher gain for values in the columns corresponding to the focused spatial regions and use lower gains for values in the columns not corresponding to the focused spatial regions, such that a smooth transition as illustrated in FIG. 23 may be realized. It should also be appreciated that more, fewer, or different options for the size of the focused spatial region may be used in the GUI 2746.

It should be appreciated that the forms of any of the GUIs described herein are non-limiting and other GUIs that accomplish the same functionality may also be used.

Figure 28:
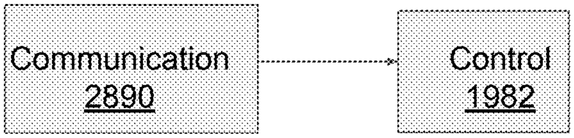
FIG. 28 illustrates a portion of an ear-worn device, in accordance with certain embodiments described herein.

FIG. 28 illustrates a portion of an ear-worn device (which may be any of the ear-worn devices described herein), in accordance with certain embodiments described herein. FIG. 28 illustrates communication circuitry 2890 and the control circuitry 1982. The communication circuitry 2890 may be configured to communicate with other devices, such as processing devices (e.g., smartphones or tablets) over wireless and/or wired communication links. For example, the wireless communication link may be Bluetooth or NFMI. As illustrated, the control circuitry 1982 may be configured to receive indications of communications from the communication circuitry 2890. The communications may be wearer selections from GUIs (e.g., any of the GUIs described/illustrated herein) displayed on a processing device. The wearer selections may relate to spatial focusing, for example. The control circuitry 1982 may then be configured to control operation of the ear-worn device based on the indications of the communications. It should be appreciated that the elements of FIG. 28 may be coupled to other elements not illustrated in FIG. 28, such as the elements of FIGS. 4-11, 19, and/or 20.

In some embodiments, an ear-worn device may include an inertial measurement unit (IMU). An IMU may include one or more of an accelerometer, a gyroscope, and a magnetometer. In some embodiments, the ear-worn device may use an IMU (in particular, an accelerometer and gyroscope of the IMU) configured to track head movements of the wearer. Two non-limiting uses for tracking head movements will be described below.

As described above, in some embodiments an ear-worn device may generate a sound map indicating the frequency components originating from each of multiple spatial regions. In such embodiments, it may be helpful to apply a moving average to values determined for different spatial regions, as this may average away some error. However, if the wearer rotates their head quickly, this may blur the average across the different spatial regions. As will be described further below, an IMU configured to track head movements (e.g., using an accelerometer and gyroscope) may be able to correct for this.

It should be appreciated that in arrays of two microphones (e.g., on hearing aids such as the hearing aid 156), the beams that can be created using beamforming (e.g., cardioids and supercardioids) may be broad, such that if the wearer was talking to a person in front of them and then turns their head, even by 90 degrees, the person's speech may only decrease in amplitude by a few dB. However, with an array of more than two microphones (e.g., on eyeglasses such as the eyeglasses 358), more narrow beams may be created. With a narrow beam, even slight head rotations may cause the amplitude of sound from a person previously directly in front of the wearer to decrease substantially. An IMU configured to track head movements (e.g., using an accelerometer and gyroscope) may be able to correct for this as well.

In more detail, an IMU configured to track head movements (e.g., using an accelerometer and gyroscope) may enable spatial regions to be defined in an absolute coordinate system, rather than the coordinate system of the wearer's head (which could rotate very quickly). The absolute coordinate system may be defined relative to the wearer's head, but on a slow timescale. Thus, if the wearer is sitting and talking to a person, briefly turns their head to look at something, then turns back to the person they are talking to, the coordinate system may stay in the same place and not rotate (or not rotate very much) with the head. But if the wearer turns and starts talking to another person, the coordinate system may slowly (e.g., over the course of several seconds) rotate with the head. To realize this, an exponential moving average may be applied to the coordinate system, such that the coordinate system is an exponential moving average of the head orientation. The timescale of the exponential moving average may be, for example, several seconds (e.g., 2, 3, 4, or 5, 6, 7, 8, 9, or 10 seconds, or any other suitable value). In some embodiments, during head movements, sounds from the new direction (i.e., the direction the wearer is turning their head towards) may be focused on immediately but sounds from the old direction (i.e., the direction the wearer is turning their head away from) may continue to be focused on and released slowly. In other words, as the wearer moves their head toward a new direction, the aperture may be broadened aperture fairly quickly to focus on sounds from the new direction but continue to focus on sounds from the previous direction as well, and then slowly wind down focus on the sounds from the previous direction as the wearer continues to look in the new direction. The winding down may be modulated as a function of how long the wearer looks in the new direction, so that a quick head glance may not cause a permanently wider aperture. In some embodiments, this behavior may be realized by an exponential moving average with a long timescale. In some embodiments, this behavior may be realized by combining 1. sounds from the new direction with full weight, and 2. sounds from the old direction processed with an exponential moving average.

Figure 29:
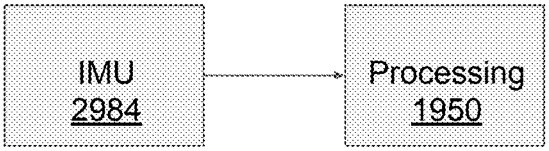
FIG. 29 illustrates a portion of an ear-worn device, in accordance with certain embodiments described herein.

FIG. 29 illustrates a portion of an ear-worn device (which may be any of the ear-worn devices described herein), in accordance with certain embodiments described herein. FIG. 29 illustrates an IMU 2984 and the processing circuitry 1950. As illustrated, the processing circuitry 1950 may be configured to receive measurements from the IMU 2984. The processing circuitry 1950 may then be configured to track head movements of the wearer of the ear-worn device using the measurements from the IMU 2984. In some embodiments, the processing circuitry 1950 may cause an absolute coordinate system to be used for spatial focusing based on the head movements, as described above. It should be appreciated that the elements of FIG. 29 may be coupled to other elements not illustrated in FIG. 29, such as the elements of FIGS. 4-11, 19, and/or 20.

As described above, binaural communication may occur in a system of two hearing aids (e.g., two of the hearing aid 156), cochlear implants, or earphones that communicate with each other over a wireless communication link. Binaural communication may also occur in an ear-worn device such as eyeglasses with built-in hearing aids (e.g., the eyeglasses 358), in which a device in a portion of the eyeglasses near one ear can communicate with a device in a portion of the eyeglasses near the other ear over a wired communication link within the eyeglasses. In some embodiments, binaural communication may facilitate communication of spatial information. For example, a mask or a sound map may be communicated from one device to another. In some embodiments, the binaural communication may occur over a low-latency communication link such as a near-field magnetic induction communication (NFMI) link.

In some embodiments, a GUI may display representations of different speakers, and the wearer may select from the GUI one of the speakers on which to focus. In some embodiments, multiple tight beams may be generated using beamforming on an array of more than two microphones, and the power of the speech signal in audio from each beam may be calculated. Beams having power above a threshold may be considered to have a speaker in the direction of the beam. In some embodiments, a neural network may be trained to determine the direction of speakers based on audio from one or more beams. In some embodiments, the information about the direction of the speakers may be transmitted from the ear-worn device to a processing device (e.g., a smartphone or tablet). The processing device may then use this information to display representations of the speakers at each of their respective directions in a GUI. Based on the wearer selecting one of the representations of the speakers from the GUI, the processing device may transmit an indication of this selection to the ear-worn device, and the ear-worn device may use a beam focused on the direction of that speaker going forward.

Figure 30:
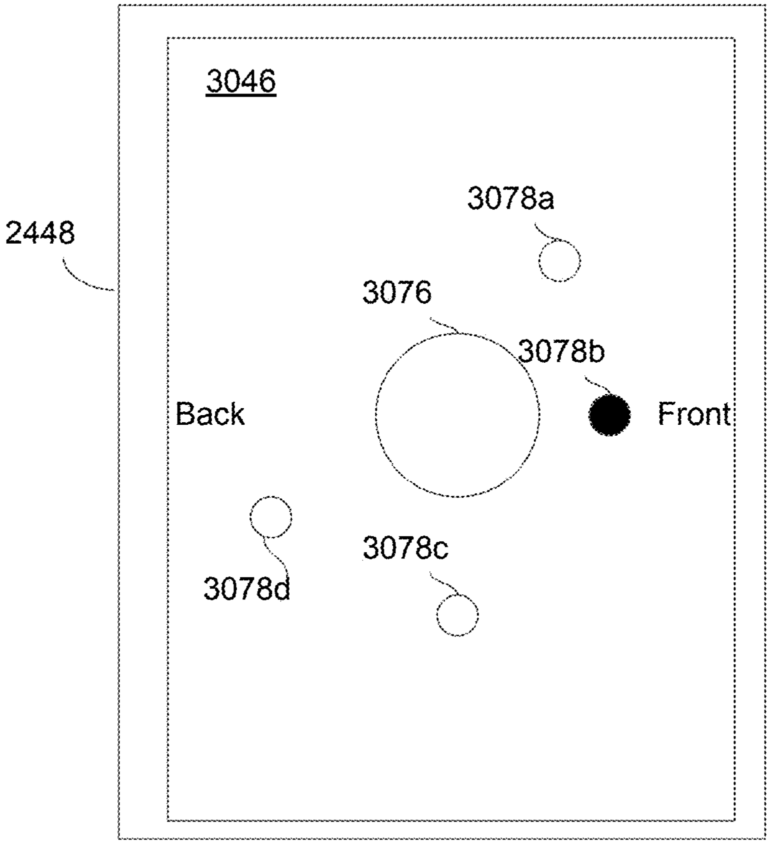
FIG. 30 illustrates a GUI for controlling spatial focusing of an ear-worn device, in accordance with certain embodiments described herein.

FIG. 30 illustrates a graphical user interface (GUI) 3046 for controlling spatial focusing of an ear-worn device (e.g., a hearing aid), in accordance with certain embodiments described herein. The GUI 3046 is displayed on the processing device 2448 (e.g., a smartphone or tablet). The GUI 3046 includes a representation of a wearer 3076 and representations of four speakers 3078*a*-3078*d* at different directions relative to the wearer. The processing device 2448 may have received indications of the directions of the speakers 3078*a*-3078*d* from the ear-worn device. In the example of FIG. 30, the wearer has selected the speaker 3078*a*, causing it to be highlighted on the GUI 3046. Based on the selection, the processing device 2448 may transmit an indication of the speaker 3078*a* and/or the direction of the speaker 3078*a* to the ear-worn device, and the ear-worn device may use a beam focused on the direction of that speaker going forward.

In some embodiments, a neural network trained to determine the direction of a target speaker (e.g., using any of the methods described herein) may run on a processing device in operative communication with an ear-worn device. The processing device may be configured to transmit an indication of the direction of the target speaker to the ear-worn device, and the ear-worn device may use a beam focused on that direction going forward.

For time-domain processing, combinations of convolutional neural networks (CNNs) and long short-term memory (LSTM) networks may be desirable; however, using two networks may increase the latency and/or power consumption. Generally, latency may refer to how long it takes from reception of a sound signal by the ear-worn device to output of the enhanced sound signal by the ear-worn device. Lower latencies may be important when the enhancement circuitry is implemented on an ear-worn device such as a hearing aid; latencies above a threshold may result in the wearer hearing echoes and/or misalignment between sound and moving lips. The inventors have recognized that it may be possible to use a single recurrent neural network (RNNs) in the enhancement circuitry, and that RNNs may be well-suited for frequency-domain processing. Accordingly, in some embodiments, a single RNN neural network may be used (e.g., implemented by neural network circuitry), and all or most of the processing done by the enhancement circuitry may be in the frequency domain.

It should also be appreciated that, in some embodiments, a single neural network may be used both for spatial focusing and for noise reduction. While using one neural network optimized for spatial focusing and one neural network optimized for noise reduction may potentially provide higher performance, the inventors have recognized that using two neural networks may involve higher latencies and/or power consumption than feasible for an ear-worn device. In some embodiments, the latency of one neural network trained both for spatial focusing and for noise reduction may be approximately equal to or less than 6 milliseconds. In some embodiments, the latency of one neural network trained both for spatial focusing and for noise reduction may be approximately equal to or less than 5 milliseconds. In some embodiments, the latency of one neural network trained both for spatial focusing and for noise reduction may be approximately equal to or less than 4 milliseconds. However, in some embodiments, one neural network optimized for spatial focusing and one neural network optimized for noise reduction may be used.

Figure 31:
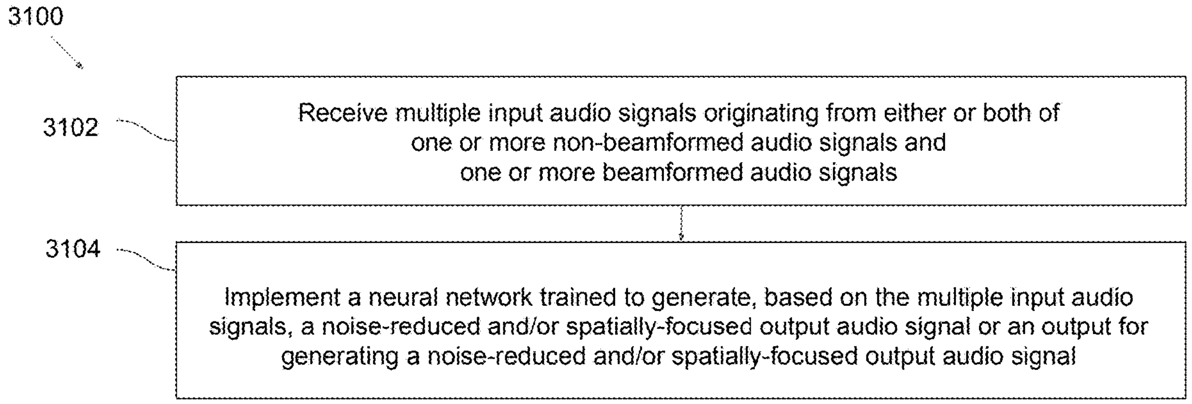
FIG. 31 illustrates a process for processing audio signals, in accordance with certain embodiments described herein.

FIG. 31 illustrates a process 3100 for processing audio signals, in accordance with certain embodiments described herein. The process 3100 may be performed using an ear-worn device, which may be any of the ear-worn devices described herein, such as an ear-worn device that includes any of the data paths 400-1100, the hearing aid 156, and/or the eyeglasses 358. In particular, the process 3100 may be performed using neural network circuitry (e.g., the neural network circuitry 424).

At step 3102, the neural network circuitry (e.g., the enhancement circuitry 412, 1912, and/or 2012) receives multiple input audio signals originating from either or both of one or more non-beamformed audio signals and one or more beamformed signals. In some embodiments, the multiple input audio signals may be frequency-domain audio signals. In some embodiments, the multiple input audio signals may include one or more frequency-domain non-beamformed signals. In some embodiments, the multiple input audio signals may include one or more beamformed frequency-domain signals. In some embodiments, the multiple input audio signals may include one or more frequency-domain non-beamformed audio signals and one or more frequency-domain beamformed signals. A frequency-domain non-beamformed audio signal may originate from a microphone signal that has undergone processing by analog processing circuitry, digital processing circuitry, and STFT circuitry. In some embodiments, the one or more frequency-domain non-beamformed signals may include a signal originating from a signal generated by a front microphone. In some embodiments, the one or more frequency-domain non-beamformed signals may include a signal originating from a signal generated by a back microphone. In some embodiments, the one or more frequency-domain non-beamformed signals may include a difference between two signals originating from signals each generated by one of two different microphones. Further description of non-beamformed signals may be found above (e.g., with reference to the frequency-domain non-beamformed audio signals 420).

A beamformed frequency-domain signal may originate from two or more microphone signals that have undergone processing by the analog processing circuitry, the digital processing circuitry, beamforming circuitry, and the STFT circuitry. Further description of beamformed signals may be found above (e.g., with reference to the frequency-domain beamformed audio signals 422).

At step 3104, the neural network circuitry implements a neural network trained to generate, based on the multiple input audio signals, a noise-reduced and/or spatially-focused output audio signal or an output for generating a noise-reduced and/or spatially-focused output audio signal. In some embodiments, the neural network may be trained to perform noise reduction. In some embodiments, the neural network may be trained to perform spatial focusing. In some embodiments, the neural network may be trained to perform noise reduction and spatial focusing. The neural network circuitry may be configured to output a single output based on the multiple input audio signals. Further description of neural networks, noise reduction, and spatial focusing may be found above (e.g., with reference to FIGS. 19-30).

While the above description of the process 3100 has focused on embodiments using frequency-domain signals, in some embodiments time-domain signals may be used.

Figure 32:
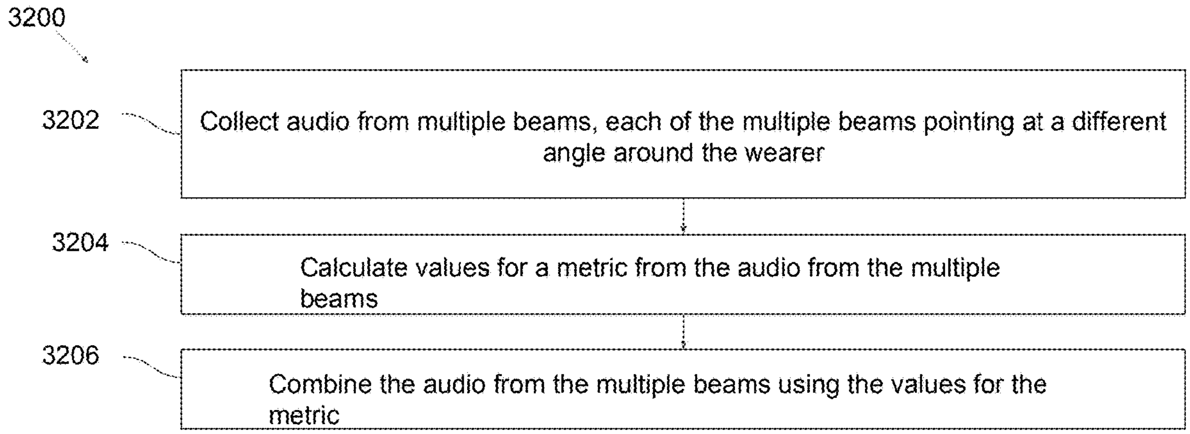
FIG. 32 illustrates a process for processing audio signals, in accordance with certain embodiments described herein.

FIG. 32 illustrates a process 3200 for processing audio signals, in accordance with certain embodiments described herein. The process 3200 may be performed using an ear-worn device, which may be any of the ear-worn devices described herein, such as an ear-worn device that includes any of the data paths 400-1100, the hearing aid 156, and/or the eyeglasses 358.

At step 3202, the ear-worn device collects audio from multiple beams, each of the multiple beams pointing at a different angle around the wearer. In some embodiments, beamforming circuitry may be configured to generate the multiple beams at each time step. In some embodiments, the multiple beams may include between or equal to 10-20 beams.

At step 3204, the ear-worn device calculates values for a metric from the audio from the multiple beams. In particular, the ear-worn device may calculate an individual value for the metric for the audio from each individual beam. Thus, each beam may have a different value for the metric. As examples, the metric may be SNR or speaker power. In some embodiments, a neural network may calculate the values for the metric. The neural network may be implemented by neural network circuitry (e.g., the neural network circuitry 424).

At step 3206, the ear-worn device combines the audio from the multiple beams using the values for the metric. In some embodiments, the enhancement circuitry may calculate the sum of the audio from each beam weighted by each beam's value for the metric. For example, if the metric is SNR, then low-SNR beams may be down-weighted and high-SNR beams may be up-weighted. Thus, focus may be placed on those beams having the highest SNR audio. In some embodiments, before summing the beams, the enhancement circuitry may be configured to apply a moving average across the audio from the different beams.

It should be appreciated that at least in some embodiments, the spatial focusing described above may not be based on using image recognition to determine the direction the wearer is looking, nor on using voice recognition to identify sounds coming from a particular speaker.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

What is claimed is:

1. An ear-worn device, comprising:

two or more microphones configured to generate audio signals, each of the two or more microphones configured to generate one of the audio signals;

wherein the two or more microphones include a front microphone and a back microphone, and wherein the front microphone is configured to generate a front time-domain audio signal and the back microphone is configured to generate a back time-domain audio signal;

processing circuitry comprising beamforming circuitry, the processing circuitry configured to generate, from the audio signals, one or more non-beamformed audio signals originating from the front time-domain audio signal and the back time-domain audio signal and one or more beamformed audio signals, the one or more non-beamformed audio signals each comprising a speech portion and a noise portion, and the one or more beamformed audio signals each comprising a speech portion and a noise portion; and neural network circuitry downstream of the beamforming circuitry, the neural network circuitry configured to:

receive multiple input signals originating from the one or more non-beamformed audio signals and the one or more beamformed audio signals; and implement one or more neural networks trained to generate, based on the multiple input signals:

a noise-reduced and/or spatially-focused output audio signal; or an output configured to generate the noise-reduced and/or spatially-focused output audio signal.

2. The ear-worn device of claim 1, wherein the two or more microphones comprise exactly two or exactly three microphones.

3. The ear-worn device of claim 1, wherein:

the output audio signal is spatially focused; and the generating of the output audio signal or the output configured to generate the output audio signal is based on a wearer selection of a size of a front-facing spatial region.

4. A system comprising:

the ear-worn device of claim 3; and a processing device in communication with the ear-worn device and configured to receive the wearer selection of the size of the front-facing spatial region.

5. The system of claim 4, wherein the processing device is configured to display multiple options for the size of the front-facing spatial region.

6. The system of claim 5, wherein the processing device is configured to display exactly two, exactly three, or exactly four options for the size of the front-facing spatial region.

7. The system of claim 5, wherein the processing device is configured, when displaying the multiple options for the size of the front-facing spatial region, to display graphical representations of the multiple options for the size of the front-facing spatial region.

8. The ear-worn device of claim 3, wherein the output audio signal uses a mapping of gains to respective spatial regions relative to a wearer of the ear-worn device.

9. The ear-worn device of claim 8, wherein the mapping of the gains to the respective spatial regions comprises mapping more than two spatial regions each to a different gain, and one or more of the spatial regions are processed with gains not equal to 1 or 0.

10. The ear-worn device of claim 1, wherein the one or more beamformed audio signals comprise multiple beamformed audio signals each having a different directional pattern, and at least one of the multiple beamformed audio signals has a dipole, hypercardioid, supercardioid, or cardioid directional pattern.

11. The ear-worn device of claim 1, wherein the neural network circuitry is configured to output a single output based on the multiple input signals.

12. An ear-worn device, comprising:

two or more microphones, wherein:

the two or more microphones comprise at least a front microphone and a back microphone; and the front microphone is configured to generate a front time-domain audio signal and the back microphone is configured to generate a back time-domain audio signal;

processing circuitry comprising beamforming circuitry, the processing circuitry configured to generate, from the front time-domain audio signal and the back time-domain audio signal, multiple beamformed signals each having a different directional pattern; and neural network circuitry downstream of the beamforming circuitry, the neural network circuitry configured to:

receive the multiple beamformed signals; and implement one or more neural networks trained to generate, based on processing together the multiple beamformed signals, a mask configured to generate a spatially-focused output audio signal;

wherein the spatially-focused output audio signal has a mapping of gain to direction-of-arrival different from any directional pattern of the multiple beamformed signals.

13. The ear-worn device of claim 12, wherein the two or more microphones comprise exactly two or exactly three microphones.

14. The ear-worn device of claim 12, wherein:

the generating of the spatially-focused output audio signal is based on a wearer selection of a size of a front-facing spatial region.

15. A system comprising:

the ear-worn device of claim 14; and a processing device in communication with the ear-worn device and configured to receive the wearer selection of the size of the front-facing spatial region.

16. The system of claim 15, wherein the processing device is configured to display multiple options for the size of the front-facing spatial region.

17. The system of claim 16, wherein the processing device is configured to display exactly two, exactly three, or exactly four options for the size of the front-facing spatial region.

18. The ear-worn device of claim 12, wherein the mapping of gain to direction-of-arrival is relative to a wearer of the ear-worn device.

19. The ear-worn device of claim 18, wherein the mapping of gain to direction-of-arrival comprises mapping more than two spatial regions each to a different gain, and one or more of the spatial regions are processed with gains not equal to 1 or 0.

20. The ear-worn device of claim 12, wherein at least one of the multiple beamformed signals has a dipole, hypercardioid, supercardioid, or cardioid directional pattern.

21. The ear-worn device of claim 12, wherein the neural network circuitry is configured to output a single output based on processing together the multiple beamformed signals.

22. The ear-worn device of claim 1, wherein the noise-reduced and/or spatially-focused output audio signal comprises a spatially-focused output audio signal.

23. The ear-worn device of claim 22, wherein the spatially-focused output audio signal has a mapping of gain to direction-of-arrival different from any directional pattern of the one or more beamformed audio signals.

24. The ear-worn device of claim 22, wherein the spatially-focused output audio signal comprises speech components with different gains based on their different directions-of-arrival.

25. The ear-worn device of claim 1, wherein the one or more beamformed audio signals comprise multiple beamformed audio signals each having a different directional pattern.

26. The ear-worn device of claim 1, wherein the one or more beamformed audio signals comprise a front-facing beamformed signal and a back-facing beamformed signal.

27. The ear-worn device of claim 12, wherein the spatially-focused output audio signal comprises speech components with different gains based on their different directions-of-arrival.

28. The ear-worn device of claim 12, wherein the multiple beamformed signals comprise a front-facing beamformed signal and a back-facing beamformed signal.

* * * * *